US012795285B2

(12) United States Patent
Leinbaugh

(10) Patent No.: US 12,795,285 B2
(45) Date of Patent: Nov. 10, 2026

(54) LOW-LATENCY WIRELESS AUDIO STREAMING

(71) Applicant: Valve Corporation, Bellevue, WA (US)

(72) Inventor: Jeffrey George Leinbaugh, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 221 days.

(21) Appl. No.: 18/523,379

(22) Filed: Nov. 29, 2023

(65) Prior Publication Data

US 2025/0175729 A1 May 29, 2025

(51) Int. Cl.
*H04R 1/10* (2026.01)
*G10K 15/02* (2006.01)
*H04R 1/02* (2006.01)

(52) U.S. Cl.
CPC ........... *H04R 1/1041* (2013.01); *G10K 15/02* (2013.01); *H04R 1/028* (2013.01); *H04R 1/1008* (2013.01); *H04R 2420/07* (2013.01); *H04R 2430/01* (2013.01); *H04R 2499/15* (2013.01)

(58) Field of Classification Search
CPC .... H04R 1/1041; H04R 1/028; H04R 1/1008; H04R 3/001; H04R 5/021; H04R 2420/07; G10K 15/02; H04S 3/008; H04S 7/30
See application file for complete search history.

(56) References Cited

U.S. PATENT DOCUMENTS

| | | | | |
|---|---|---|---|---|
| 10,871,939 | B2 | 12/2020 | Dantrey et al. | |
| 2002/0133248 | A1* | 9/2002 | Fay | G10H 1/0091 700/94 |
| 2005/0187775 | A1* | 8/2005 | Abe | G11B 20/18 386/E5.052 |
| 2013/0223538 | A1* | 8/2013 | Wang | H04N 21/43637 375/E7.027 |
| 2019/0349662 | A1* | 11/2019 | Lindahl | G06F 1/163 |
| 2020/0053460 | A1* | 2/2020 | Pedersen | G06F 12/0815 |
| 2021/0224028 | A1 | 7/2021 | Kim et al. | |

FOREIGN PATENT DOCUMENTS

WO WO2023056280 A1 4/2023

OTHER PUBLICATIONS

Search Report and Written Opinion for International Application No. PCT/US2024/057439, Dated Jan. 21, 2025, 14 pages.

* cited by examiner

*Primary Examiner* — Duc Nguyen
(74) *Attorney, Agent, or Firm* — Lee & Hayes, P.C.

(57) ABSTRACT

Streaming audio data wirelessly to a head-mounted display (HMD) with low latency and with reduced auditory artifacts is described. An example process includes determining one or more statistics indicative of a latency associated with audio data received wirelessly by the HMD and stored in a buffer of the HMD, and determining to adjust a size of the buffer based at least in part on the statistic(s). To decrease the size of the buffer, segments of the audio data may be replaced with a synthetic audio data segment to obtain modified audio data in the buffer. To increase the size of the buffer, a synthetic audio data segment(s) may be added to the audio data to obtain modified audio data in the buffer. Audio content can then be output via one or more speakers of the HMD based at least in part on the modified audio data.

20 Claims, 10 Drawing Sheets

LOW-LATENCY WIRELESS AUDIO STREAMING

BACKGROUND

Wireless streaming technology is used both within and outside of the video game industry. In the video game industry, virtual reality (VR) gaming systems may utilize wireless streaming technology in order to leverage the high-computing capacity of a host computer for executing a video game, while providing a wearer of a wireless VR headset with greater mobility, as compared to a tethered (non-wireless) headset.

Despite these advantages, it can be challenging to develop VR gaming systems that reliably stream data over consumer-grade wireless local area networks (LANs), such as home WiFi networks. For instance, the inherent unpredictability in the performance of consumer-grade wireless LANs coupled with the relatively low latency tolerance of VR gaming applications makes it difficult to ensure that every data packet will arrive at a VR headset in time to output corresponding VR content at a constant rate and free from artifacts. As it pertains to audio data, if a data packet carrying the audio data is lost or late to arrive at the VR headset, the user may hear auditory artifacts in the audio content, such as "pops," "scratches," and/or abrupt silence.

Provided herein are technical solutions to improve and enhance these and other systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
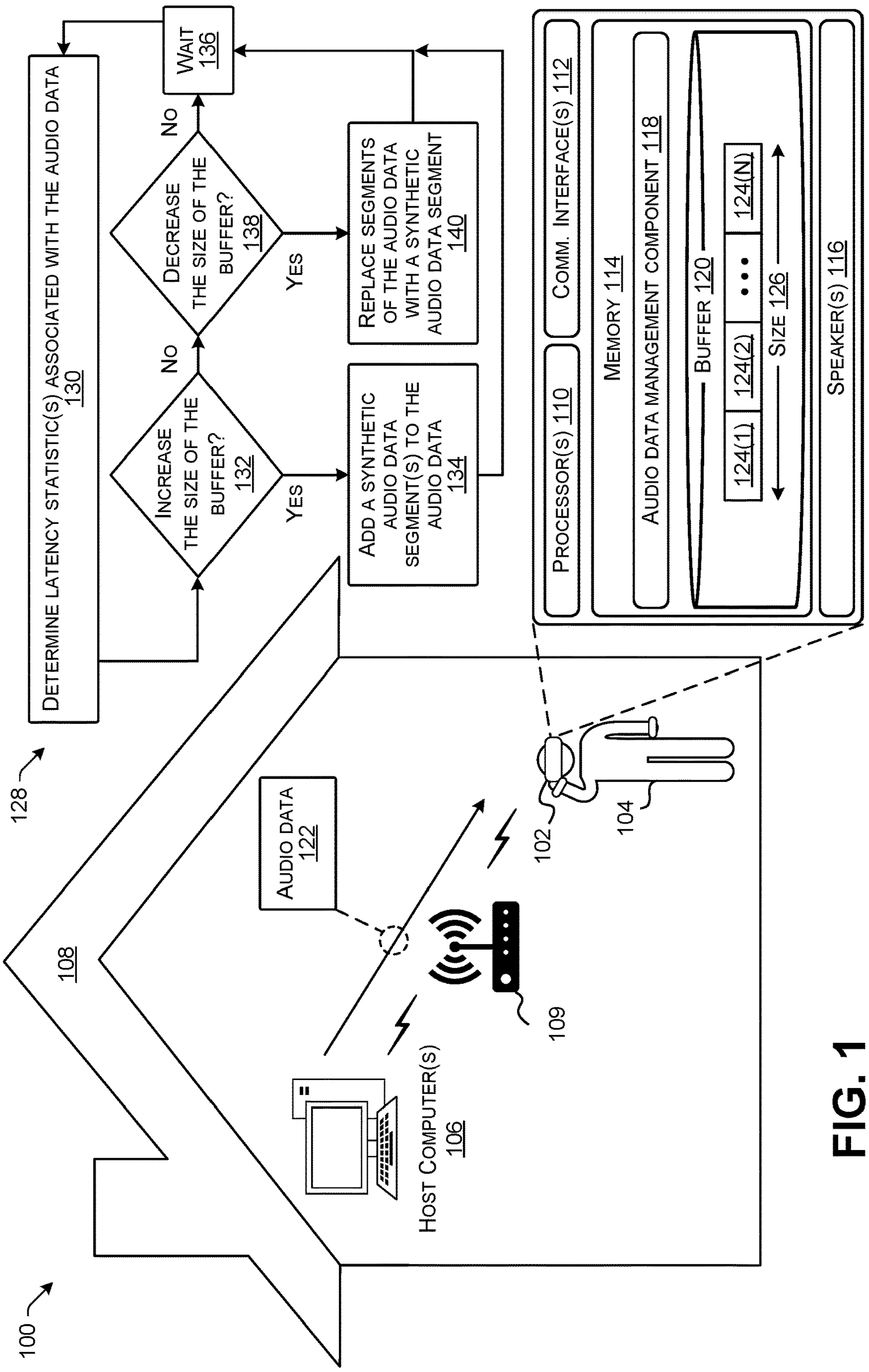
FIG. 1 illustrates an example environment for streaming audio data wirelessly to a head-mounted display (HMD) with low latency.

As mentioned above, VR gaming applications have a relatively low latency tolerance, which makes it challenging to develop VR gaming systems that reliably stream audio data over consumer-grade wireless LANs, such as home WiFi networks. For example, if network congestion and/or interference spikes in a wireless LAN during a gaming session, audio data that is being carried by wirelessly transmitted data packets may be late to arrive at a HMD, or may not arrive at all, which may cause auditory artifacts to be exhibited in the audio content that is being output via the speaker(s) of the HMD.

Described herein are, among other things, techniques, devices, and systems for streaming audio data wirelessly to a HMD with low latency and with reduced auditory artifacts in the audio content that is being output to a wearer of the HMD. As used herein, "latency" can refer to a period of delay between a time at which audio data is received by a HMD (or an earlier time associated with generating or transmitting the audio data to the HMD) and a time at which corresponding audio content is output via a speaker(s) of the HMD. In some examples, the HMD is configured to store, in a buffer, audio data that the HMD received wirelessly (e.g., from a host computer) before the corresponding audio content is output via one or more speakers of the HMD. In some examples, this buffer is a jitter buffer that is utilized, at least in part, to eliminate jitter by queuing the audio data in a sequence of audio data segments to absorb delay differences between wirelessly transmitted data packets carrying the audio data. In these examples, a processor(s) (e.g., a processor(s) of the HMD) is configured to dynamically adjust a size of the buffer, thereby dynamically adjusting a latency associated with the audio data. As used herein, "dynamically" adjusting the size of the buffer can mean using an automated process to increase or decrease the size of the buffer without user intervention, and in real-time or near real-time. Moreover, the size of the buffer may be adjusted by modifying the buffered audio data in a manner that mitigates auditory artifacts that would otherwise be exhibited in the audio content being output via the speaker(s) of the HMD based on modifications to the buffered audio data.

To illustrate, if, based at least in part on one or more latency statistics associated with the buffered audio data, the processor(s) determines to decrease a size of the buffer, the processor(s) may replace segments of the buffered audio data with a synthetic audio data segment to obtain modified audio data in the buffer. In some examples, the processor(s) may create the synthetic audio data segment based at least in part on a combination of non-sequential segments of the buffered audio data, and the processor(s) may replace the non-sequential segments and one or more intermediate segments of the audio data between the non-sequential segments with the synthetic audio data segment to obtain the modified audio data in the buffer. In some examples, the synthetic audio data segment is created by overlapping the non-sequential segments and cross-fading respective audio signal waveforms of the non-sequential segments, thereby "smoothing" the transition between the combined non-sequential segments to mitigate (e.g., conceal, hide, etc.) auditory artifacts that would otherwise result from the modification of the buffered audio data. Conversely, if, based at least in part on the latency statistic(s), the processor(s) determines to increase the size of the buffer, the processor(s) may add a synthetic audio data segment to the buffered audio data to obtain modified audio data in the buffer. In some examples, the processor(s) may create the synthetic audio data segment based at least in part on a combination of non-sequential segments of the buffered audio data (e.g., by overlapping the non-sequential segments and cross-fading respective audio signal waveforms of the non-sequential segments). In this manner, the buffered audio data can be modified (e.g., tweaked at a scale of milliseconds (ms)) in order to stay within range of a target latency while mitigating auditory artifacts in the corresponding audio content that is being output via a speaker(s) of a HMD. Accordingly, as network conditions fluctuate, the processor(s) can execute instructions to maintain audio latency within a prescribed latency tolerance, and the modifications made to the buffered audio data are inconspicuous to the wearer of the HMD when the corresponding audio content is output via the speaker(s) of the HMD.

While many of the examples described herein pertain to gaming systems, the forthcoming description is not limited to gaming systems, or even to VR systems, as the techniques described herein may be implemented in any suitable HMD system that includes a host computer and a wireless HMD communicatively coupled thereto. For example, the HMD may be worn by a user (or wearer) for purposes of immersing the user in a VR environment, an augmented reality (AR) environment, and/or a mixed reality (MR) environment, as the case may be, and these environments may be gaming-related or not related to gaming. One or more display panels of the HMD are configured to present images based on video data generated by an executing application (e.g., a video game), and one or more speakers of the HMD are configured to output audio content based on audio data generated by the executing application. The application may execute on the host computer and may generate pixel data and audio data, the pixel data being processed to present corresponding video content (e.g., images) via the HMD, and the audio data being processed to output audio content via the HMD. The video content is viewed by the user through the optics included in the HMD, and the audio content is heard by the user through the speaker(s) of the HMD, thereby making the user perceive the content as if the user was immersed in a VR, AR, and/or MR environment.

Also disclosed herein are techniques, devices, and systems for utilizing thresholds to maintain audio latency within range of a target latency and/or to mitigate auditory artifacts in audio content that is being output via a speaker(s) of a HMD. For example, if the latency associated with audio data received wirelessly by a HMD and stored in a buffer of the HMD is within range of a target latency, a processor(s) may refrain from adjusting the size of the buffer, but if the audio latency crosses a low threshold less than the target latency, the processor(s) may dynamically increase the size of the buffer to keep the audio latency within range of the target latency. Conversely, if the audio latency crosses a high threshold greater than the target latency, the processor(s) may decrease the size of the buffer to keep the audio latency within range of the target latency. In some examples, if the audio latency crosses a critical threshold that is less than the low threshold mentioned above, the processor(s) may cause audio content to be "replayed" by iteratively outputting audio content via the speaker(s) of the HMD for a predefined number of times in an attempt to allow the audio latency to increase above the critical threshold, and the processor(s) may thereafter attempt to increase the audio latency above the low threshold so that the audio latency returns to within range of the target latency. In some examples, if network conditions degrade and/or if the system malfunctions such that no additional audio data is received by the HMD after the audio latency crosses the critical threshold, the processor(s) may implement a "last resort" technique of fading out the remaining audio content by progressively decreasing a volume of the audio content as the remaining audio content is output via the speaker(s) of the HMD. After this fade out, normal operation of the HMD system may resume once audio data is again received by the HMD. Accordingly, audio latency can be maintained within range of a target latency under normal operating conditions, and auditory artifacts and/or abrupt silence can be mitigated when network conditions degrade past a certain point.

Also disclosed herein are techniques, devices, and systems for mitigating auditory artifacts that would otherwise result from a missing data packet(s) within an audio data stream. For example, a processor(s) may determine, based at least in part on analyzing audio data packets received wirelessly by the HMD, that a missing data packet(s) was not received by the HMD. A data packet may be missing from an audio data stream if the data packet is dropped or lost after the data packet was transmitted wirelessly by the host computer. In this scenario, the processor(s) may create a synthetic audio data segment based at least in part on a combination of non-sequential segments of the audio data surrounding the missing data packet(s) (e.g., by overlapping the non-sequential segments and cross-fading respective audio signal waveforms of the non-sequential segments), and the processor(s) may replace the on-sequential segments with the synthetic audio data segment to obtain modified audio data in the buffer. When the modified audio data is processed for outputting corresponding audio content via the speaker(s) of the HMD, any auditory artifacts that would otherwise result from the missing data packet(s) are mitigated.

The techniques, devices, and systems described herein may provide an improved user experience (e.g., an improved gaming experience for a player of a video game). This is at least because buffered audio data can be modified (e.g., tweaked) gracefully in order to control audio latency (e.g., on a scale of ms) while mitigating auditory artifacts in the audio content output via the HMD. Accordingly, a wearer of the HMD is able to hear audio content, and any distortions in the audio content resulting from modifications made to, and/or discontinuities in, the buffered audio data are inconspicuous to the wearer. Additionally, or alternatively, the techniques, devices, and systems described herein improve the audio output functionality of a HMD and/or a HMD system (e.g., a VR gaming system) by mitigating auditory artifacts in the audio content while adhering to a low latency tolerance for streaming audio data. Additionally, or alternatively, the techniques, devices, and systems described herein allow one or more devices to conserve resources with respect to processing resources, memory resources, networking resources, etc., in the various ways described herein. For example, by controlling audio latency to be within an upper bound of a target latency (e.g., by dynamically decreasing a size of a buffer of the HMD), memory resources are conserved by refraining from storing more than a threshold amount of audio data in the buffer at any given moment. As another example, networking resources are conserved by avoiding retransmission techniques to compensate for data packets that are missing from an audio data stream; instead, the buffered audio data is modified without retransmission of a missing data packet(s) to mitigate auditory artifacts in the audio content that would otherwise result from the missing data packet(s). These are merely examples of computing resources that may be conserved by implementing the techniques described herein.

While many examples provided herein pertain to streaming audio data over wireless LANs, such as home WiFi networks, it is to be appreciated that the techniques described herein may be implemented in geographically distributed systems and/or networks, such as systems that stream audio data over a wide area network(s) (e.g., the Internet). For example, a HMD that streams data from a remote server (e.g., the "Cloud") may implement the techniques described herein to stream audio data with low latency and with mitigation of auditory artifacts in the audio content. Moreover, as mentioned above, the techniques described herein may be implemented in gaming (e.g., VR gaming) systems, and/or non-gaming and/or non-VR systems.

FIG. 1 illustrates an example environment 100 for streaming audio data wirelessly to a HMD with low latency. FIG. 1 depicts a HMD 102 worn by a user 104, as well as a host computer(s) 106. FIG. 1 depicts an example implementation of a host computer 106 in the form of a personal computer (PC), which may be situated in the user's 104 household 108, for example. It is to be appreciated, however, that this example type of host computer 106 is non-limiting to the present disclosure. For example, the host computer 106 can be implemented as any type and/or any number of computing devices, including, without limitation, a PC, a laptop computer, a desktop computer, a portable digital assistant (PDA), a mobile phone, tablet computer, a set-top box, a game console, a server computer, a wearable computer (e.g., a smart watch, etc.), or any other electronic device that can transmit data to, and receive data from, other devices. The host computer 106 may be collocated in the same environment as the HMD 102, such as the household 108 of the user 104 wearing the HMD 102. Alternatively, the host computer 106 may be remotely located with respect to the HMD 102, such as a host computer 106 in the form of a server computer(s) that is located at a remote geographical location with respect to the geographical location of the HMD 102. In a remote host computer 106 implementation, the host computer 106 may be communicatively coupled to the HMD 102 via a wide-area network, such as the Internet. In a local host computer 106 implementation, the host computer 106 may be collocated in an environment (e.g., a household 108) with the HMD 102, whereby the host computer 106 and the HMD 102 may be communicatively coupled together either directly or over a LAN via one or more intermediary network devices 109. In the example of FIG. 1, the network device 109 that is used to transmit data wirelessly between the host computer 106 and the HMD 102 may represent a wireless router.

In the example of FIG. 1, the HMD 102 and the host computer 106 are communicatively coupled together and are configured to work together in a collaborative fashion to generate data, and to output corresponding content (e.g., image(s), audio content, etc.) via one or more output devices of the HMD 102. This collaboration allows for iteratively rendering content at the HMD 102 (e.g., video content and audio content for a VR game). In the illustrated implementation, the HMD 102 includes one or more processors 110, a communications interface(s) 112, memory 114 (e.g., non-transitory computer-readable media), and/or one or more speakers 116. Components of the HMD 102 and/or a HMD system will be described in more detail below with reference to FIG. 10. In general, the HMD 102 may include logic (e.g., software, hardware, and/or firmware, etc.) that is configured to implement the techniques, functionality, and/or operations described herein. The memory 114 can include various modules, such as instruction, datastores, and so forth, which may be configured to execute on the processor(s) 110 for carrying out the techniques, functionality, and/or operations described herein. An example functional module in the form of an audio data management component 118 is shown as being stored in the memory 114 and executable on the processor(s) 110, although the same functionality may alternatively be implemented in hardware, firmware, or as a system on a chip (SOC), and/or other logic. Furthermore, additional or different functional modules may be stored in the memory 114 and executable on the processor(s) 110. FIG. 1 further illustrates a buffer 120 (e.g., a volatile memory buffer, such as a dynamic random-access memory (DRAM) buffer), which may be part of the memory 114 and used to temporarily store audio data until it is used, transmitted, deleted, and/or stored persistently.

In some examples, the HMD 102 may represent a VR headset for use in VR systems, such as for use with a VR gaming system. In these examples, the host computer 106 may execute one or more VR video game applications and may send associated data wirelessly to the HMD 102 to render VR video game content via the HMD 102. However, the HMD 102 may additionally, or alternatively, be implemented as an AR headset for use in AR video game applications, a MR headset for use in MR video game applications, or a headset that is usable for VR, AR, and/or MR applications that are not game-related (e.g., industrial applications, robotic applications, military/weapon applications, medical applications, or the like).

In general, an application(s) executing on the host computer 106 can represent a graphics-based application(s) (e.g., a video game). An application is configured to generate pixel data for video content (e.g., a series of images) and audio data for audio content, and such data is transmitted wirelessly to the HMD 102. The data that is received by the HMD 102 can be processed to output corresponding content (e.g., video content and audio content) via the HMD 102. In some examples, the host computer 106 may iteratively receive data from the HMD 102, such as head tracking data, at any suitable frequency (e.g., a frequency on the order of 1000 hertz (Hz)), and the application(s) executing on the host computer 106 may generate video data and audio data based at least in part on the data (e.g., head tracking data) received from the HMD 102. For example, pose data indicative of a predicted pose of the HMD 102 may be received by the host computer 106 and provided to the application(s) that is executing thereon for generating data for an upcoming frame. FIG. 1 illustrates audio data 122 that is generated at the host computer 106 (e.g., by the executing application(s), such as a video game) and sent wirelessly to the HMD 102, although it is to be appreciated that pixel data may also be generated and sent wirelessly to the HMD 102. The audio data 122 can be sent wirelessly to the HMD 102 in data packets. Accordingly, the HMD 102 may be configured to receive, via the communications interface(s) 112 (e.g., a wireless radio), data packets carrying the audio data 122.

In some examples, the data packets carrying the audio data 122 may be numbered sequentially, which may indicate a sequence of the data packets. In this manner, the audio data management component 118 may be configured to analyze the received data packets to determine if any data packets are out-of-order or missing within the audio data stream. In some examples, an individual data packet may carry a single frame of audio data 122, or multiple sequential frames of audio data 122. A "frame" of audio data 122 is a collection of time-coincident audio samples. In some examples, there are multiple (e.g., two) audio samples per frame; one audio sample of a left channel and another audio sample for a right channel, and these channels may correspond to left and right speakers 116 of the HMD 102. In some examples, an individual data packet may carry a particular amount of audio data 122. The particular amount of the audio data 122 carried in an individual packet can be measured using any suitable metric, such as a number of bytes (or megabytes, gigabytes, etc.) of data, an amount of playback time (e.g., 10 ms of audio data 122).

In response to receiving audio data 122 via the communications interface(s) 112 of the HMD 102, the processor(s) 110 may execute the audio data management component 118 to process the received audio data 122 for carrying out the techniques, functionality, and/or operations described herein. For example, the processor(s) 110 may execute the audio data management component 118 to store the audio data 122 in the buffer 120 of the HMD 102. In some examples, the audio data 122 may be stored in the buffer 120 as a sequence of audio data segments 124(1), 124(2), . . . , 124(N) (collectively 124). An individual audio data segment 124 can represent an audio sample, a frame, a data packet, or any other suitable segment of the received audio data 122. In some examples, the audio data management component 118 may be configured to partition the received audio data 122 into the segments 124, such as by partitioning the audio data 122 into blocks or chunks using any suitable segmentation algorithm, such as an algorithm that analyzes the audio signal waveform associated with the audio data 122 and partitions the audio data 122 into segments 124 at points in the waveform where the amplitude of the waveform is minimized to mitigate artifacts when segments 124 are moved, deleted, and/or combined in the buffer 120.

Initially, when the user 104 powers on the HMD 102, the buffer 120 may be empty. In some examples, the processor(s) 110 may execute the audio data management component 118 to "lock" the buffer 120 until a threshold amount of the audio data 122 (e.g., a threshold number of audio data segments 124) is stored in the buffer 120. This threshold amount of audio data 122 is sometimes referred to herein as a "fill depth." "Locking" the buffer 120, in this context, can mean holding the queued audio data segments 124 in the buffer 120 and refraining from processing the audio data segments 124 to prevent output of audio content via the speaker(s) 116 of the HMD 102. Once the buffer 120 is "filled" to this fill depth, however, the processor(s) 110 may execute the audio data management component 118 to start processing the buffered audio data segments 124 to cause corresponding audio content to be output (or played) via the speaker(s) 116 of the HMD 102.

In some examples, the buffer 120 represents a jitter buffer. In these examples, the buffer 120 can be utilized to eliminate jitter by queuing the audio data 122 in a sequence of audio data segments 124(1)-(N) to absorb delay differences between wirelessly transmitted data packets carrying the audio data 122 as the audio data 122 is delivered to the HMD 102. In other words, storing the audio data 122 in the buffer 120 may provide time for any late-arriving audio data packets to "catch up" so that the buffered audio data 122 can be processed to output corresponding audio content via the speaker(s) 116 at a constant rate. In some examples, the buffer 120 represents a dynamic jitter buffer, and, hence, a size 126 of the buffer 120 may be adjusted dynamically. In these examples, the processor(s) 110 is configured to execute the audio data management component 118 to dynamically adjust the size 126 of the buffer 120, thereby adjusting a latency associated with the audio data 122. Moreover, the size 126 of the buffer 120 may be adjusted in a manner that mitigates auditory artifacts that would otherwise be exhibited in the audio content that is being output via the speaker(s) 116 of the HMD 102, as described in more detail below.

In some examples, the size 126 of the buffer 120 can be increased to a maximum size and decreased to a minimum size. As the size 126 of the buffer 120 is increased towards the maximum size, the latency associated with the audio data 122 increases, which means that the playout delay of corresponding audio content becomes longer. As the size 126 of the buffer 120 is decreased towards the minimum size, the latency associated with the audio data 122 decreases, which means that the playout delay of the audio content becomes shorter. Accordingly, one might conceptualize the adjustment of the size 126 of the buffer 120 as either "fast forwarding" or "rewinding" the buffered audio data. Because the audio latency tolerance may be relatively low, the maximum size of the buffer 120 may be limited to an amount of audio data 122 that corresponds to less than 100 ms of audio playback. In some examples, the maximum size of the buffer 120 is within a range of 30 to 50 ms of audio playback. For instance, unlike prerecorded audio data associated with music, movies, or the like, it may be impracticable to store a large amount of audio data 122 (e.g., more than 100 ms of audio playback) in the buffer 120. Instead, audio content may be output within tens of ms (e.g., within 20 to 25 ms) after the HMD 102 receives the corresponding audio data 122. In some example, the minimum size of the buffer 120 may be a non-zero value to ensure that at least some audio data 122 is stored in the buffer 120 at any given time.

The processes described herein are illustrated as a collection of blocks in a logical flow graph, which represent a sequence of operations that can be implemented in hardware, software, firmware, or a combination thereof (e.g., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 1 further illustrates a flow diagram of an example process 128 for streaming audio data wirelessly to the HMD 102 with low latency. At block 130, the processor(s) 110 of the HMD 102 may execute the audio data management component 118 to determine one or more statistics indicative of a latency associated with audio data 122 received wirelessly by the HMD 102 and stored in the buffer 120 of the HMD 102. The latency statistic(s) determined at block 130 may be used to determine whether to adjust the size 126 of the buffer 120, whether to increase or decrease the size 126 of the buffer 120, and/or an amount by which to adjust the size 126 of the buffer 120.

In some examples, the latency statistic(s) determined at block 130 may include, without limitation, a minimum latency of the received audio data 122 (e.g., the audio data segments 124 stored in the buffer 120), a maximum latency of the received audio data 122, an average latency of the received audio data 122, and/or a standard deviation associated with the received audio data 122. In some examples, the latency statistic(s) determined at block 130 may indicate a number of ms of audio playback that is associated with the audio data 122 (e.g., audio data segments 124) stored in the buffer 120. In some examples, the latency statistic(s) may be determined at block 130 at any suitable rate or frequency, such as a rate of 2 Hz. There is a tradeoff for determining the latency statistic(s) at a faster rate verses a slower rate. For example, if the latency statistic(s) is/are determined at a slower rate, computing resources may be conserved, but larger modifications to the buffered audio data 122 may be made at the slower rate to adjust the size 126 of the buffer 120. On the other hand, if the latency statistic(s) is/are determined at a faster rate, more computing resources are used to determine the latency statistic(s), but smaller modifications to the buffered audio data 122 can be made at the faster rate to adjust the size 126 of the buffer 120 by relatively smaller amounts, which may be less noticeable to the wearer of the HMD 102. Regardless, at block 130, the latency statistic(s) may be determined by analyzing the audio data 122 received since the previous latency statistic(s) were determined (e.g., the audio data 122 received in the last 500 ms).

At block 132, a determination may be made as to whether to increase the size 126 of the buffer 120. In some examples, the determination is made at block 132 based at least in part on the latency statistic(s) determined at block 130. For example, the processor(s) 110 may execute the audio data management component 118 at block 132 to compare the latency statistic(s) determined at block 130 to a target latency and/or to a low threshold that is less than the target latency. Based at least in part on this comparison, the audio data management component 118 may determine, at block 132, whether to increase the size 126 of the buffer 120, and/or an amount by which to increase the size 126 of the buffer 120. In other words, an example objective of the audio data management component 118 may be to maintain audio latency within range of a target latency, and the latency statistic(s) determined at block 130 may be informative as to whether the audio latency is out of range or within range of the target latency. If the determination at block 132 is to increase the size 126 of the buffer 120, the process 128 may follow the YES route from block 132 to block 134.

At block 134, the processor(s) 110 may execute the audio data management component 118 to add a synthetic audio data segment(s) to the buffered audio data 122 (e.g., to the sequence of audio data segments 124 stored in the buffer 120) to obtain modified audio data in the buffer 120. By adding a synthetic audio data segment(s) to the buffered audio data 122 without deleting or replacing any of the existing audio data segments 124, the size 126 of the buffer 120 is increased, thereby increasing the audio latency. An example technique for creating the synthetic audio data segment(s) to add to the buffered audio data 122 at block 134 is discussed in more detail below with reference to FIG. 3. In some examples, the synthetic audio data segment(s) added to the buffered audio data 122 at block 134 is/are generated by artificial intelligence (AI) (e.g., an AI-generated synthetic audio data segment(s)). For example, a trained AI model(s) (e.g., a trained machine learning model(s)) can receive at least some of the buffered audio data 122 as input (e.g., a prompt), and the trained model(s) may generate a synthetic audio data segment(s) to add to the audio data stream in the buffer 120. In some examples, an amount by which to increase the size 126 of the buffer 120 is determined at block 132, and a number of synthetic audio data segments that are added to the buffered audio data 122 at block 134 is based at least in part on this amount. For example, if it is determined to increase audio latency by 10 ms, one synthetic audio data segment that corresponds to 10 ms of audio playback may be added to the buffered audio data 122. In another example, if it is determined to increase audio latency by 20 ms, two synthetic audio data segments that correspond to a total of 20 ms of audio playback may be added to the buffered audio data 122. Following block 134, the process 128 may proceed to block 136 where the processor(s) 110 may wait for the next statistic calculation period to commence (e.g., after a lapse of 500 ms since determining the latency statistic(s) at block 130, the process 128 may proceed from block 136 to block 130 to iterate the process 128). If the determination at block 132 is to refrain from increasing the size 126 of the buffer 120, the process 128 may follow the NO route from block 132 to block 138.

At block 138, a determination may be made as to whether to decrease the size 126 of the buffer 120. In some examples, the determination is made at block 138 based at least in part on the latency statistic(s) determined at block 130. For example, the processor(s) 110 may execute the audio data management component 118 at block 138 to compare the latency statistic(s) determined at block 130 to a target latency and/or to a high threshold that is greater than the target latency. Based at least in part on this comparison, the audio data management component 118 may determine, at block 138, whether to decrease the size 126 of the buffer 120, and/or an amount by which to decrease the size 126 of the buffer 120. If the determination at block 138 is to decrease the size 126 of the buffer 120, the process 128 may follow the YES route from block 138 to block 140.

At block 140, the processor(s) 110 may execute the audio data management component 118 to replace audio data segments 124 stored in the buffer 120 with a synthetic audio data segment to obtain modified audio data in the buffer 120. By replacing multiple audio data segments 124 in the buffered audio data 122 with a synthetic audio data segment that is smaller in size (or shorter in audio playback duration) than the multiple audio data segments 124 being replaced, the size 126 of the buffer 120 is decreased, thereby decreasing the audio latency. An example technique for creating the synthetic audio data segment to replace the multiple audio data segments 124 in the buffered audio data 122 at block 140 is discussed in more detail below with reference to FIG. 2. In some examples, the synthetic audio data segment that is used to replace the multiple audio data segments 124 in the buffered audio data 122 at block 140 is an AI-generated synthetic audio data segment. For example, a trained AI model(s) (e.g., a trained machine learning model(s)) can receive at least some of the buffered audio data 122 as input (e.g., a prompt), and the trained model(s) may generate a synthetic audio data segment to replace multiple audio data segments within the audio data stream in the buffer 120. In some examples, an amount by which to decrease the size 126 of the buffer 120 is determined at block 138, and a number of audio data segments 124 that are replaced at block 140 is based at least in part on this amount. Following block 140, the process 128 may proceed to block 136 where the processor(s) 110 may wait for the next statistic calculation period to commence (e.g., after a lapse of 500 ms since determining the latency statistic(s) at block 130, the process 128 may proceed from block 136 to block 130 to iterate the process 128). If the determination at block 138 is to refrain from decreasing the size 126 of the buffer 120, the process 128 may follow the NO route from block 138 to block 136 where the processor(s) 110 may wait for the next statistic calculation period to commence before proceeding to block 130 to iterate the process 128. Accordingly, the process 128 may be implemented to dynamically adjust the size 126 of the buffer 120, thereby adjusting audio latency on-the-fly (e.g., during a game session involving the HMD 102).

Figure 2:
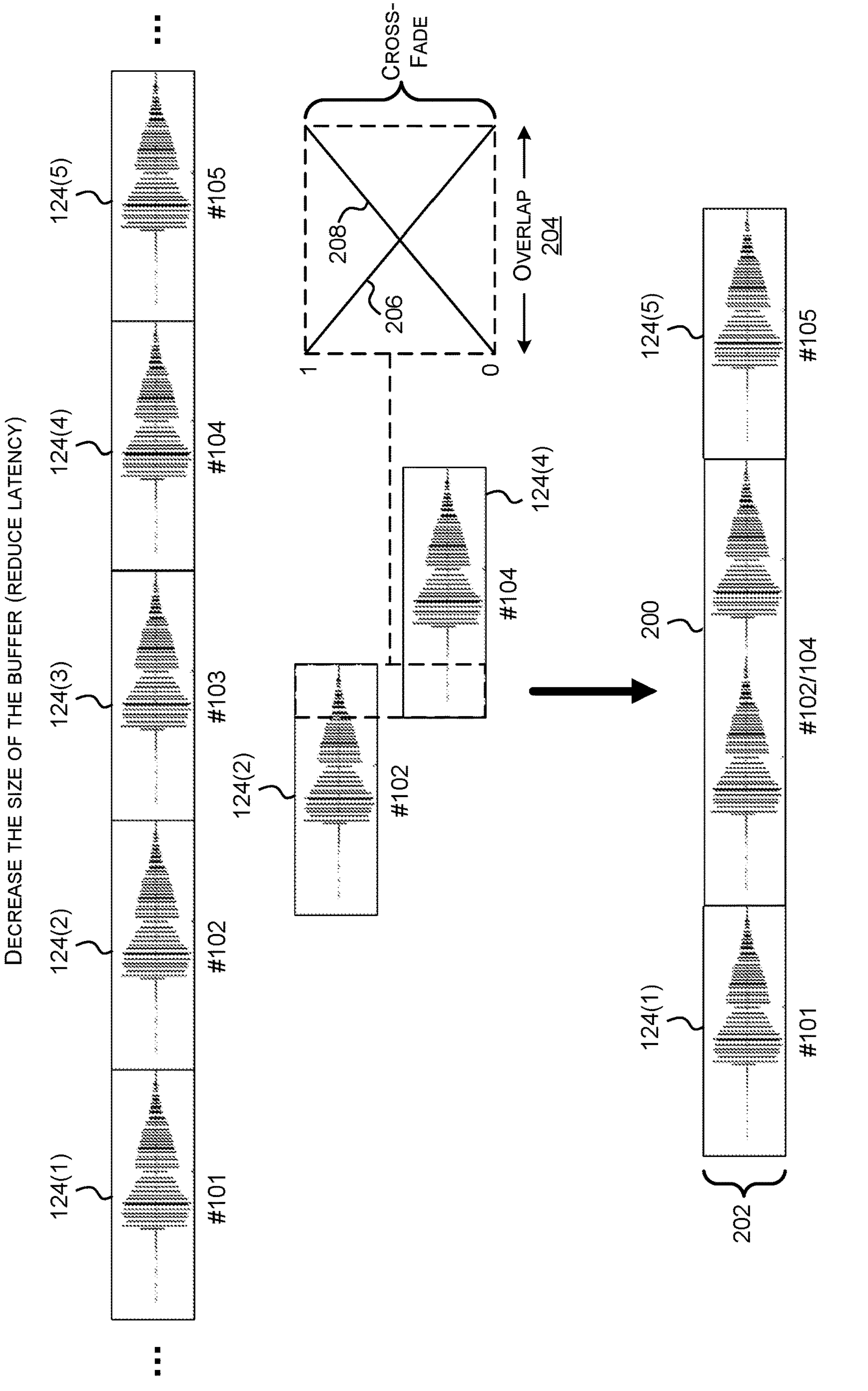
FIG. 2 is a schematic diagram illustrating a technique for decreasing the size of an audio data buffer of a HMD.

FIG. 2 is a schematic diagram illustrating a technique for decreasing the size 126 of an audio data buffer 120 of a HMD 102. The technique illustrated in FIG. 2 may be performed at block 140 of the process 128 described above, in some examples. As shown in FIG. 2, the audio data 122 stored in the buffer 120 at any given moment may include a sequence of audio data segments 124(1), 124(2), 124(3), 124(4), and 124(5). As indicated by the ellipses to the left and to the right of the sequence of segments 124(1)-(5), additional segments 124 may be stored in the buffer 120, in some examples. If each segment 124 corresponds to 10 ms of audio playback, the size 126 of the buffer 120 may correspond to 50 ms of audio latency, assuming there are no other segments 124 stored in the buffer 120 besides segments 124(1)-(5). As shown in FIG. 2, a synthetic audio data segment 200 may be created based at least in part on a combination of non-sequential segments 124 of the audio data 122 stored in the buffer 120. For example, segments 124(2) and 124(4) are non-sequential segments 124 because segment 124(4) does not immediately follow segment 124(2) in the sequence of segments 124(1)-(5); rather, an intermediate segment 124(3) is between the non-sequential segments 124(2) and 124(4). Any suitable selection algorithm can be used to determine which non-sequential segments 124 to select from the segments 124 of audio data 122 stored in the buffer 120. In some examples, the most-recently stored non-sequential segments 124 are selected to provide time for the modification of the buffered audio data 122 while earlier-stored segments 124 are processed. In some examples, non-sequential segments 124 near the middle of the sequence of buffered segments 124 are selected.

FIG. 2 further illustrates that the non-sequential segments 124(2) and 124(4) and the intermediate segment 124(3) can be replaced with the synthetic audio data segment 200 to obtain modified audio data 202 in the buffer 120. In the example of FIG. 2, the modified audio data 202 in the buffer 120 may include a new sequence of audio data segments that includes an original audio data segment 124(1), followed by the synthetic audio data segment 200, followed by another original audio data segment 124(5). In other words, a gap in the audio data stream may be created by removing the intermediate segment 124(3), and this gap may be closed by combining the non-sequential segments 124(2) and 124(4) surrounding the intermediate segment 124(3) to create the synthetic audio data segment 200, which is used to replace all three segments 124(2)-124(4) in the example of FIG. 2. For a larger adjustment to the size 126 of the buffer 120, a larger number of segments 124 can be replaced. For example, non-sequential segments 124(1) and 124(5) were combined to create a synthetic audio data segment, the synthetic audio data segment may replace all five segments 124(1)-(5), which includes three intermediate segments 124(2)-(4). In any case, in the example of FIG. 2, if each segment 124 corresponds to 10 ms of audio playback, and if the synthetic audio data segment 200 corresponds to, say, 15 ms of audio playback, the size 126 of the buffer 120 may be reduced by 15 ms (e.g., from 50 ms of audio latency to 35 ms of audio latency). In some examples, 35 ms of audio latency is within range of a target latency, and, hence, the latency reduction technique illustrated in FIG. 2 may serve to maintain audio latency within range of a target latency.

In some examples, the synthetic audio data segment 200 can be created by overlapping the non-sequential segments 124(2) and 124(4) and cross-fading respective audio signal waveforms of the non-sequential segments 124(2) and 124(4). For example, FIG. 2 shows that the audio data segment 124(2) and the audio data segment 124(4) can be overlapped by an amount of overlap 204. In some examples, the amount of overlap 204 is predetermined. In some examples, the amount of overlap 204 is determined dynamically. For examples, the amount of overlap 204 may be determined based at least in part on the amount of audio data 122 (e.g., the number of audio data segments 124 currently stored in the buffer 120). In some examples, the amount of overlap 204 may be determined based at least in part on an amount of the audio data 112 (e.g., a number of audio data segments 124) stored in the buffer 120 before, after, and/or including the to-be-replaced segments 124(2)-(4). To cross-fade the respective audio signal waveforms of the non-sequential segments 124(2) and 124(4), a metric (e.g., voltage, power, etc.) associated with the audio signal waveforms may be maintained at a constant value across the overlap 204 by starting a cross-fade function 206 at a value of 1 for one of the audio signal waveforms and ramping to zero, and by starting a cross-fade function 208 at a value of zero for the other of the audio signal waveforms and ramping to 1. In some examples, a windowing function is used to combine the non-sequential audio data segments 124(2) and 124(4) to create the synthetic audio data segment 200, such as a Hann windowing function. In some examples, a pitch synchronous overlap and add (PSOLA) algorithm can be used to combine the non-sequential audio data segments 124(2) and 124(4) to create the synthetic audio data segment 200. In some examples, the processor(s) 110 analyzes the respective audio signal waveforms to identify a zero crossing point for the start of the cross-fade functions 206, 208. These techniques may help to "smooth" the transition between the combined non-sequential segments 124(2) and 124(4) to mitigate (e.g., conceal, hide, etc.) auditory artifacts that would otherwise result from the modification of the buffered audio data 122.

Figure 3:
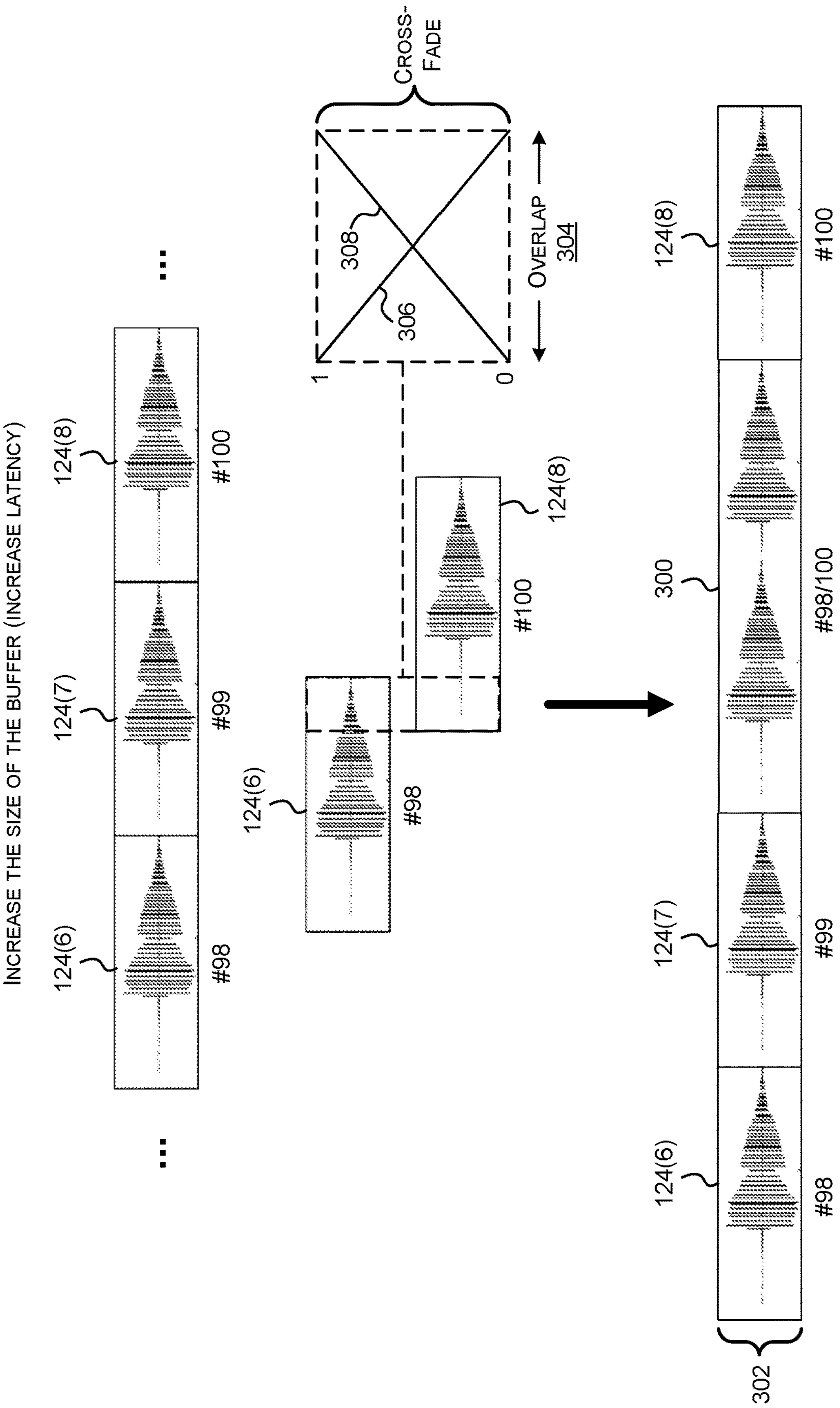
FIG. 3 is a schematic diagram illustrating a technique for increasing the size of an audio data buffer of a HMD.

FIG. 3 is a schematic diagram illustrating a technique for increasing the size of an audio data buffer 120 of a HMD 102. The technique illustrated in FIG. 3 may be performed at block 134 of the process 128 described above, in some examples. As shown in FIG. 3, the audio data 122 stored in the buffer 120 at any given moment may include a sequence of audio data segments 124(6), 124(7), and 124(8). As indicated by the ellipses to the left and to the right of the sequence of segments 124(6)-(8), additional segments 124 may be stored in the buffer 120, in some examples. As shown in FIG. 3, a synthetic audio data segment 300 may be created based at least in part on a combination of non-sequential segments 124 of the audio data 122 stored in the buffer 120. For example, segments 124(6) and 124(8) are non-sequential segments 124 because segment 124(8) does not immediately follow segment 124(6) in the sequence of segments 124(6)-(8); rather, an intermediate segment 124(7) is between the non-sequential segments 124(6) and 124(8). Any suitable selection algorithm can be used to determine which non-sequential segments 124 to select from the segments 124 of audio data 122 stored in the buffer 120. In some examples, the most-recently stored non-sequential segments 124 are selected to provide time for the modification of the buffered audio data 122 while earlier-stored segments 124 are processed. In some examples, non-sequential segments 124 near the middle of the sequence of buffered segments 124 are selected.

FIG. 3 further illustrates that the synthetic audio data segment 300 can be added to the buffered audio data 122 (e.g., to the sequence of segments 124(6)-(8)) to obtain modified audio data 302 in the buffer 120. In the example of FIG. 3, the modified audio data 302 in the buffer 120 may include a new sequence of audio data segments that includes an original audio data segment 124(6), followed by another original audio data segment 124(7), followed by the synthetic audio data segment 300, followed by another original audio data segment 124(8). In other words, the synthetic audio data segment 300 can be inserted into, or appended to, the sequence of segments 124(6)-(8) obtain the modified audio data 302 in the buffer 120. For a larger adjustment to the size 126 of the buffer 120, a larger number of synthetic audio data segments (e.g., multiple synthetic audio data segments) may be created and added to the buffered audio data 122. In some examples, the synthetic audio data segment 300 is inserted into the buffered audio data 122 in a position that is adjacent to (e.g., immediately preceding or immediately following) one of the non-sequential segments 124(6) and 124(8) that was used to create the synthetic audio data segment 300. For example, the synthetic audio data segment 300 is positioned adjacent to the segment 124(8) in the example of FIG. 3. For example, the synthetic audio data segment 300 precedes one of the non-sequential segments 124 (namely, the segment 124(8)) within the modified audio data 302.

In some examples, the synthetic audio data segment 300 can be created by overlapping the non-sequential segments 124(6) and 124(8) and cross-fading respective audio signal waveforms of the non-sequential segments 124(6) and 124 (8). This technique may be similar to the technique described above with reference to FIG. 2 and the non-sequential segments 124(2) and 124(4). For example, the non-sequential segments 124(6) and 124(8) can be overlapped by an amount of overlap 304 that is predetermined or determined dynamically. Furthermore, to cross-fade the respective audio signal waveforms of the non-sequential segments 124(6) and 124(8), a metric (e.g., voltage, power, etc.) associated with the audio signal waveforms may be maintained at a constant value across the overlap 304 by starting a cross-fade function 306 at a value of 1 for one of the audio signal waveforms and ramping to zero, and by starting a cross-fade function 308 at a value of zero for the other of the audio signal waveforms and ramping to 1. In some examples, a windowing function, such as a Hann windowing function, is used to combine the non-sequential audio data segments 124(6) and 124(8) to create the synthetic audio data segment 300. In some examples, a PSOLA algorithm can be used to combine the non-sequential audio data segments 124(6) and 124(8) to create the synthetic audio data segment 300. In some examples, the processor(s) 110 analyzes the respective audio signal waveforms to identify a zero crossing point for the start of the cross-fade functions 306, 308. These techniques may help to "smooth" the transition between the combined non-sequential segments 124(6) and 124(8) to mitigate (e.g., conceal, hide, etc.) auditory artifacts that would otherwise result from the modification of the buffered audio data 122.

Figure 4:
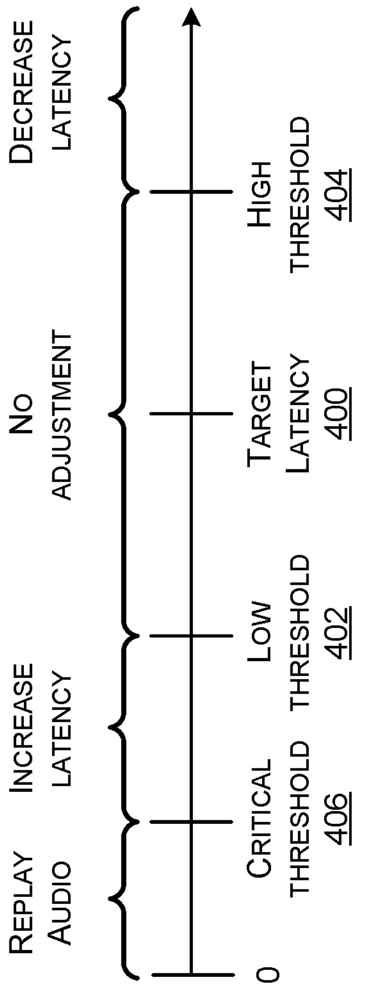
FIG. 4 is a schematic diagram illustrating example thresholds that may be utilized for maintaining audio latency within range of a target latency.

FIG. 4 is a schematic diagram illustrating example thresholds that may be utilized for maintaining audio latency within range of a target latency. In the example of FIG. 4, a target latency 400 may represent an ideal audio latency of the HMD system under normal conditions (e.g., where network traffic is flowing with little-to-no network congestion, and/or little-to-no interference, etc.). In some examples, the target latency 400 is predetermined. In an example, the target latency 400 may be set to a value within a range of about 20 to 25 ms of audio playback. In some examples, the target latency 400 may be determined dynamically based at least in part on the latency statistic(s) determined periodically (e.g., at block 130 of the process 128 of FIG. 1). An example objective of the audio data management component 118 may be to maintain audio latency within range of the target latency 400 by making iterative adjustments to the size 126 of the buffer 120, as described herein.

FIG. 4 further depicts a low threshold 402 and a high threshold 404 to provide a margin around the target latency 400. An audio latency that is within these soft limits (e.g., equal to or greater than the low threshold 402 and less than or equal to the high threshold 404) may be considered to be "within range" of the target latency 400. As illustrated in FIG. 4, the low threshold 402 is less than the target latency 400 and the high threshold 404 is greater than the target latency 400. In some examples, the low threshold 402 is less than the target latency 400 by an amount of about 10 ms of audio playback, and the high threshold 404 is greater than the target latency 400 by an amount of about 10 ms of audio playback. In some examples, the low threshold 402 and/or the high threshold 404 are predetermined and set at fixed distances from the target latency 400. In some examples, the low threshold 402 and/or the high threshold 404 are adjusted dynamically relative to, or in coordination with, the target latency 400 based at least in part on the latency statistic(s) determined periodically (e.g., at block 130 of the process 128 of FIG. 1). FIG. 4 further depicts a critical threshold 406 that is less than the low threshold 402. These example thresholds 402, 404, 406 can be utilized, in some examples, to maintain audio latency within range of the target latency 400 and/or to mitigate auditory artifacts in audio content that is being output via the speaker(s) 116 of the HMD 102. For example, if the latency associated with audio data 122 received wirelessly by the HMD 102 and stored in the buffer 120 is within range of the target latency 400, the audio data management component 118 may refrain from adjusting the size 126 of the buffer 120, but if the audio latency crosses the low threshold 402, the audio data management component 118 may dynamically increase the size 126 of the buffer 120 to keep the audio latency within range of the target latency 400. Conversely, if the audio latency crosses the high threshold 404, the audio data management component 118 may decrease the size 126 of the buffer 120 to keep the audio latency within range of the target latency 400. In some examples, if the audio latency crosses the critical threshold 406, the audio data management component 118 may cause audio content to be "replayed" by iteratively outputting audio content via the speaker(s) 116 of the HMD 102 for a predefined number of times (e.g., two times) in an attempt to allow the audio latency to increase above the critical threshold 406, and the audio data management component 118 may thereafter attempt to increase the audio latency above the low threshold 402 so that the audio latency returns to within range of the target latency 400. In some examples, if network conditions degrade and/or if the system malfunctions such that no additional audio data 122 is received by the HMD 102 after the audio latency crosses the critical threshold 406, the audio data management component 118 may implement a "last resort" technique of fading out the remaining audio content by progressively decreasing a volume of the audio content as the remaining audio content is output via the speaker(s) 116 of the HMD 102. After this fade out, normal operation of the HMD system may resume once audio data 122 is again received by the HMD 102 and the buffer 120 begins to fill up again. Accordingly, audio latency can be maintained within range of the target latency 400 under normal operating conditions, and auditory artifacts and/or abrupt silence can be mitigated when network conditions degrade past a certain point.

Figure 5:
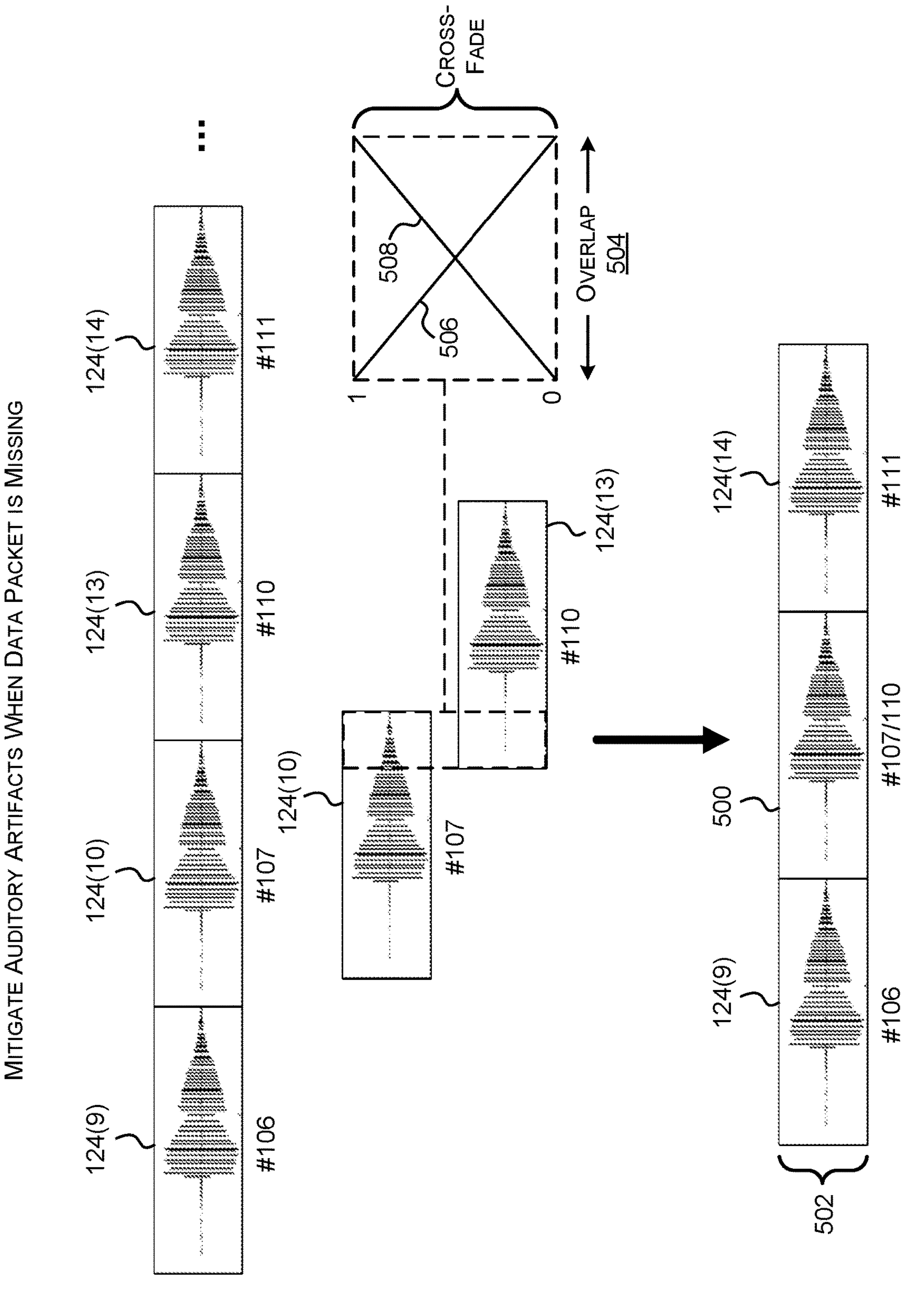
FIG. 5 is a schematic diagram illustrating a technique for mitigating auditory artifacts that would otherwise result from an audio data stream that is missing a data packet(s).

FIG. 5 is a schematic diagram illustrating a technique for mitigating auditory artifacts that would otherwise result from an audio data stream that is missing a data packet(s). As mentioned above, in some examples, the data packets carrying the audio data 122 received by the HMD 102 may be numbered sequentially, which may indicate a sequence of the data packets. In this manner, the audio data management component 118 may be configured to analyze the received data packets to determine if any data packets are out-of-order or missing within the audio data stream. For example, if the audio data management component 118 determines, based at least in part on analyzing audio data packets received wirelessly by the HMD 102, that a missing data packet(s) was not received by the HMD 102, the audio data management component 118 may create a synthetic audio data segment 500 based at least in part on a combination of non-sequential segments 124 of the audio data 122 surrounding the missing data packet(s). In the example of FIG. 5, the missing data packet may have been carrying audio data segments labeled #108 and #109 within the sequence of segments labeled #106-111. These missing audio data segments may represent audio data samples within the missing data packet. Accordingly, the sequence of audio data segments 124(9), 124(10), 124(13), and 124(14) in the buffer 120 may include segments 124 labeled #106, #107, #110, #111, etc. In this example, the segments 124(10) and 124 (13) are non-sequential, and they surround the missing data packet. As such, non-sequential segments 124(10) and 124 (13) can be combined to create the synthetic audio data segment 500. FIG. 5 further illustrates that the non-sequential segments 124(10) and 124(13) can be replaced with the synthetic audio data segment 500 to obtain modified audio data 502 in the buffer 120. In the example of FIG. 5, the modified audio data 502 in the buffer 120 may include a new sequence of audio data segments that includes an original audio data segment 124(9), followed by the synthetic audio data segment 500, followed by another original audio data segment 124(14). In other words, a gap in the audio data stream created by the missing data packet may be closed by combining the non-sequential segments 124(10) and 124 (13) surrounding missing data packet to create the synthetic audio data segment 500, which is used to replace the non-sequential segments 124(10) and 124(13) in the example of FIG. 5.

In some examples, the synthetic audio data segment 500 can be created by overlapping the non-sequential segments 124(10) and 124(13) and cross-fading respective audio signal waveforms of the non-sequential segments 124(10) and 124(13). This technique may be similar to the technique described above with reference to FIG. 2 and the non-sequential segments 124(2) and 124(4). For example, the non-sequential segments 124(10) and 124(13) can be overlapped by an amount of overlap 504 that is predetermined or determined dynamically. Furthermore, to cross-fade the respective audio signal waveforms of the non-sequential segments 124(10) and 124(13), a metric (e.g., voltage, power, etc.) associated with the audio signal waveforms may be maintained at a constant value across the overlap 504 by starting a cross-fade function 506 at a value of 1 for one of the audio signal waveforms and ramping to zero, and by starting a cross-fade function 508 at a value of zero for the other of the audio signal waveforms and ramping to 1. In some examples, a windowing function, such as a Hann windowing function, is used to combine the non-sequential audio data segments 124(10) and 124(13) to create the synthetic audio data segment 500. In some examples, a PSOLA algorithm can be used to combine the non-sequential audio data segments 124(10) and 124(13) to create the synthetic audio data segment 500. In some examples, the processor(s) 110 analyzes the respective audio signal waveforms to identify a zero crossing point for the start of the cross-fade functions 506, 508. These techniques may help to "smooth" the transition between the combined non-sequential segments 124(10) and 124(13). Accordingly, when the modified audio data 502 is processed for outputting corresponding audio content via the speaker(s) 116 of the HMD 102, any auditory artifacts that would otherwise result from the missing data packet(s) are mitigated.

Figure 6:
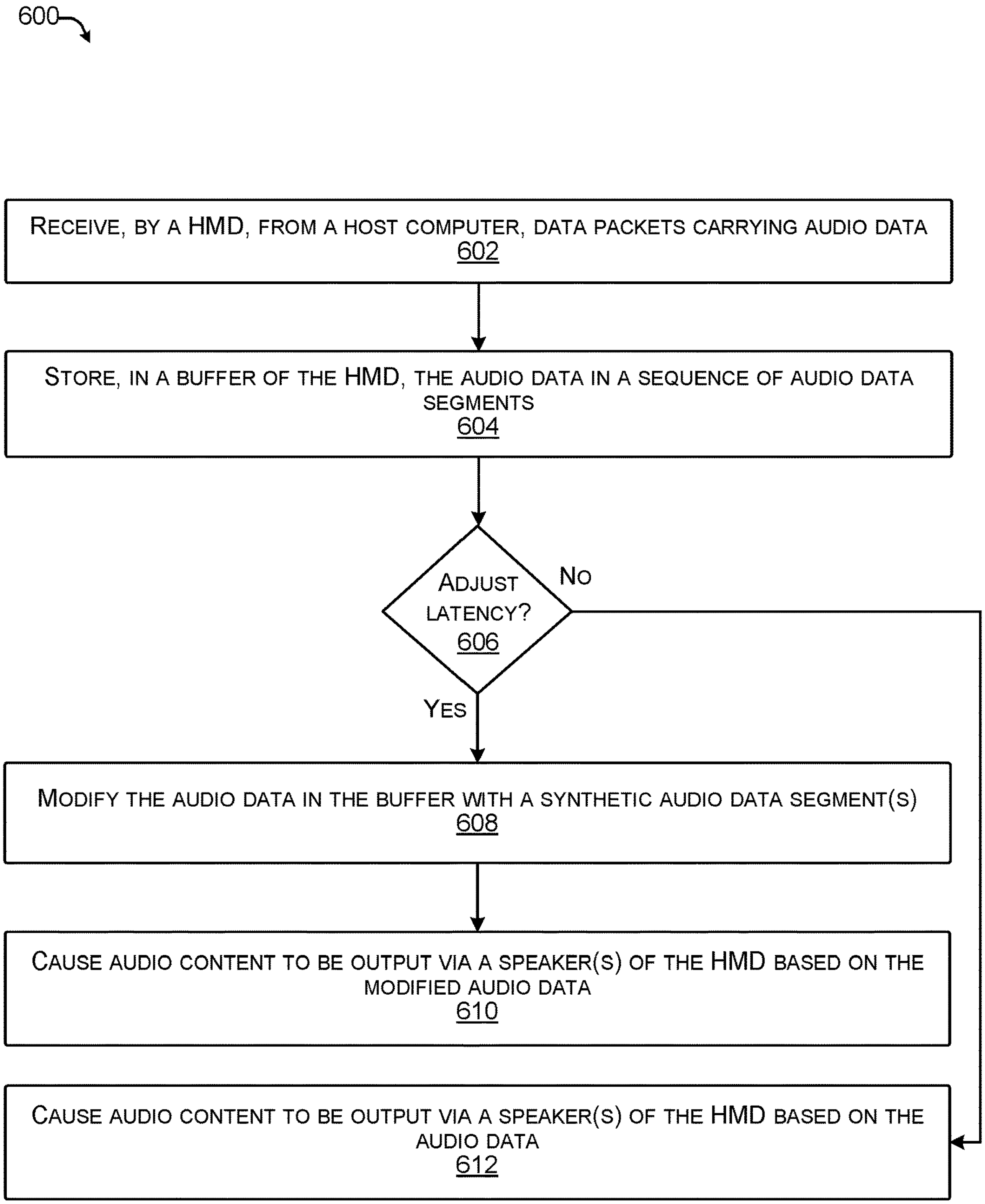
FIG. 6 is a flow diagram of an example process for streaming audio data wirelessly to a HMD with low latency.

FIG. 6 is a flow diagram of an example process 600 for streaming audio data wirelessly to a HMD with low latency. For discussion purposes, the process 600 is described with reference to the previous figures.

At block 602, a HMD 102 may receive, from a host computer 106, data packets carrying audio data 122. The audio data 122 is received wirelessly by the HMD 102 in the data packets at block 602. For example, the HMD 102 may receive the data packets wirelessly at block 602 via the communications interface(s) 112 (e.g., a wireless radio). In some examples, the data packets received at block 602 are numbered sequentially, which may indicate a sequence of the data packets. In this manner, the audio data management component 118 may be configured to analyze the received data packets to determine if any data packets are out-of-order or missing within the audio data stream. In some examples, an individual data packet received at block 602 may carry a single frame of audio data 122, or multiple sequential frames of audio data 122. In some examples, an individual data packet may carry a particular amount of audio data 122, as described herein.

At block 604, and in response to receiving the data packets at block 602, a processor(s) (e.g., the processor(s) 110 of the HMD 102) may execute the audio data management component 118 to store the audio data 122 in a buffer 120 of the HMD 102. In some examples, the audio data 122 may be stored in the buffer 120 as a sequence of audio data segments 124(1), 124(2), . . . , 124(N) (collectively 124). An individual audio data segment 124 can represent an audio sample, a frame, a data packet, or any other suitable segment of the received audio data 122. In some examples, the audio data management component 118 may be configured to partition the received audio data 122 into the segments 124, such as by partitioning the audio data 122 into blocks or chunks using any suitable segmentation algorithm, as described herein.

At block 606, a determination is made as to whether to adjust a latency associated with the received audio data 122 that is stored in the buffer 120. In some examples, the determination is made at block 606 based at least in part on one or more latency statistics associated with the buffered audio data 122, as described herein. In some examples, the thresholds 402, 404, and/or 406 described above with reference to FIG. 4 may be utilized at block 606 to determine whether to adjust the audio latency. If the audio data management component 118 determines to adjust the audio latency at block 606, the process 600 may follow the YES route from block 606 to block 608.

At block 608, the processor(s) (e.g., the processor(s) 110) may execute the audio data management component 118 to modify the audio data 122 stored in the buffer 120 with a synthetic audio data segment(s). For example, if the determination at block 606 is to reduce the audio latency, the audio data management component 118 may modify the buffered audio data 122 with the synthetic audio data segment 200 using the technique described above with reference to FIG. 2 to obtain modified audio data 202 in the buffer 120. Conversely, if the determination at block 606 is to increase the audio latency, the audio data management component 118 may modify the buffered audio data 122 with the synthetic audio data segment 300 (or with multiple synthetic audio data segments) using the technique described above with reference to FIG. 3 to obtain modified audio data 302 in the buffer 120.

At block 610, the processor(s) (e.g., the processor(s) 110) may cause audio content to be output via one or more speakers 116 of the HMD 102 based at least in part on the modified audio data (e.g., the modified audio data 202, 302). For example, a series of audio data segments 124, including the synthetic audio data segment(s) 200, 300, may be processed from the buffer 120 to output corresponding audio content via the speaker(s) 116 at block 610. If the audio data management component 118 determines to refrain from adjusting the audio latency at block 606, the process 600 may follow the NO route from block 606 to block 612 where the processor(s) (e.g., the processor(s) 110) may cause audio content to be output via one or more speakers 116 of the HMD 102 based at least in part on the unmodified audio data 122 stored in the buffer 120. Accordingly, the process 600 can be performed at runtime, during a session involving the HMD 102 (e.g., during a game session), to maintain audio latency within range of a target latency 400 through relatively small modifications to the buffered audio data at block 608.

Figure 7:
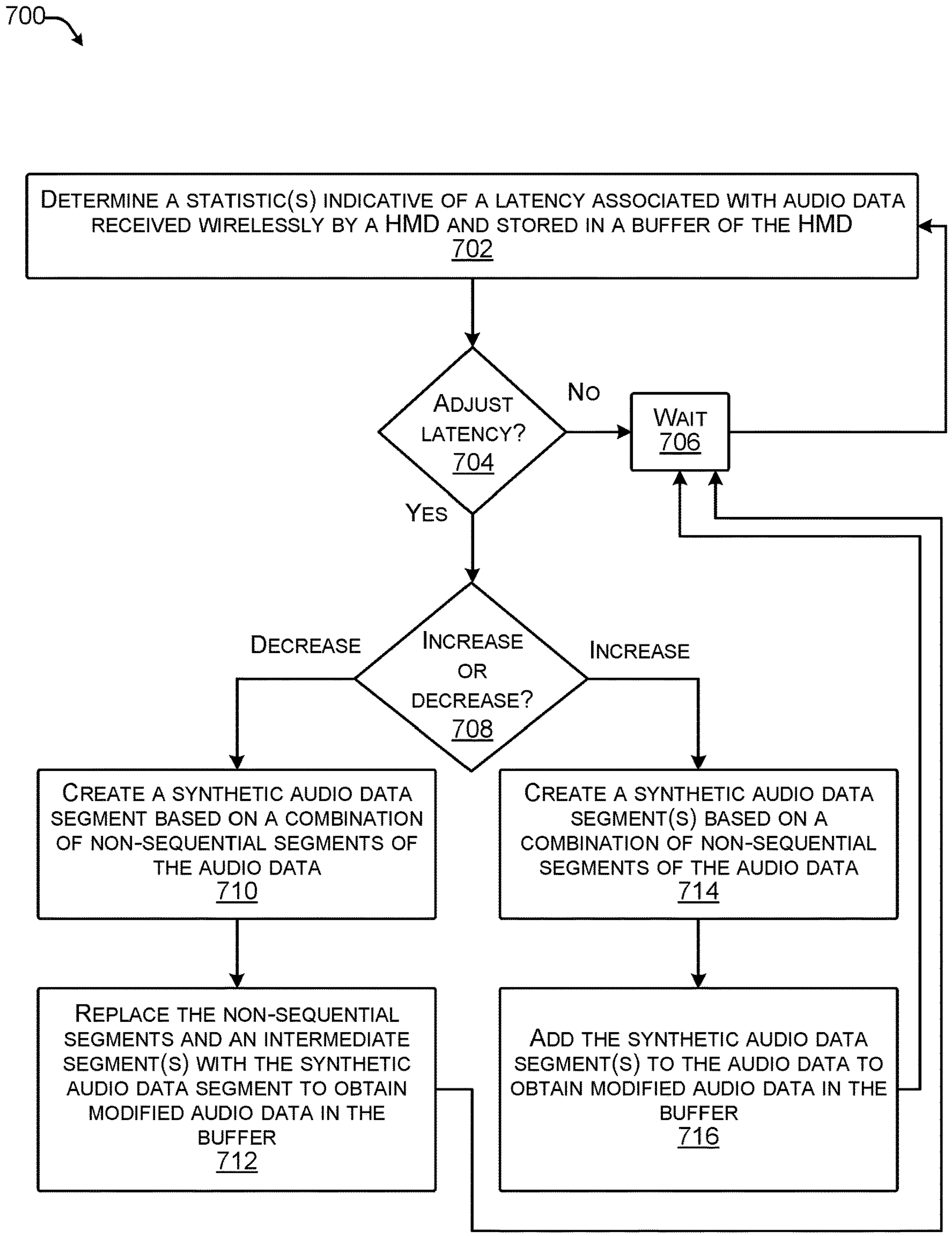
FIG. 7 is a flow diagram of an example process for adjusting audio latency by using a synthetic audio data segment(s) to modify buffered audio data.

FIG. 7 is a flow diagram of an example process 700 for adjusting audio latency by using a synthetic audio data segment(s) to modify buffered audio data. For discussion purposes, the process 700 is described with reference to the previous figures.

At block 702, a processor(s) (e.g., the processor(s) 110 of the HMD 102) may execute the audio data management component 118 to determine one or more statistics indicative of a latency associated with audio data 122 received wirelessly by the HMD 102 and stored in the buffer 120 of the HMD 102. The latency statistic(s) determined at block 702 may be similar to those described above with respect to block 130 of the process 128, and the latency statistic(s) may be used to determine whether to adjust the size 126 of the buffer 120, whether to increase or decrease the size 126 of the buffer 120, and/or an amount by which to adjust the size 126 of the buffer 120.

Accordingly, at block 704, a determination is made, based at least in part on the latency statistic(s) determined at block 702, as to whether to adjust a latency associated with the received audio data 122 that is stored in the buffer 120. For example, the processor(s) (e.g., the processor(s) 110) may execute the audio data management component 118 at block 704 to compare the latency statistic(s) determined at block 702 to a target latency 400 and/or to a threshold(s) 402, 404 that is less than or greater than the target latency 400. Based at least in part on this comparison, the audio data management component 118 may determine, at block 704, whether to adjust the audio latency. If the audio data management component 118 determines to refrain from adjusting the audio latency at block 704, the process 700 may follow the NO route from block 704 to block 706 where the processor(s) may wait for the next statistic calculation period to commence before determining the latency statistic(s) again at block 702. For example, if latency statistics are determined at a rate of 2 Hz, the processor(s) may wait at block 706 until the next 500 ms period commences before returning to block 702. If the audio data management component 118 determines to adjust the audio latency at block 704, the process 700 may follow the YES route from block 704 to block 708.

At block 708, a determination is made as to whether to increase or decrease the audio latency. In some examples, a comparison of the latency statistic(s) determined at block 702 to a target latency 400 and/or to a threshold(s) 402, 404 that is less than or greater than the target latency 400 may indicate that the audio latency is "too low" or "too high" (e.g., out-of-range of the target latency 400). Accordingly, if the audio data management component 118 determines to decrease the audio latency at block 708, the process 700 may follow the DECREASE route from block 708 to block 710.

At block 710, the processor(s) (e.g., the processor(s) 110) may execute the audio data management component 118 to create a synthetic audio data segment 200 based at least in part on a combination of non-sequential segments 124 of the audio data 122 stored in the buffer 120. For example, as illustrated in FIG. 2, the audio data management component 118 may create the synthetic audio data segment 200 based at least in part on a combination of non-sequential segments 124(2) and 124(4). In some examples, the synthetic audio data segment 200 can be created by overlapping the non-sequential segments 124(2) and 124(4) and cross-fading respective audio signal waveforms of the non-sequential segments 124(2) and 124(4), as described above. For example, the non-sequential segments 124(2) and 124(4) can be overlapped by an amount of overlap 204 that is predetermined or determined dynamically. Furthermore, to cross-fade the respective audio signal waveforms of the non-sequential segments 124(2) and 124(4), a metric (e.g., voltage, power, etc.) associated with the audio signal waveforms may be maintained at a constant value across the overlap 204 by starting a cross-fade function 206 at a value of 1 for one of the audio signal waveforms and ramping to zero, and by starting a cross-fade function 208 at a value of zero for the other of the audio signal waveforms and ramping to 1. In some examples, a windowing function, such as a Hann windowing function, is used to combine the non-sequential audio data segments 124(2) and 124(4) at block 710 to create the synthetic audio data segment 200. In some examples, a PSOLA algorithm can be used to combine the non-sequential audio data segments 124(2) and 124(4) at block 710 to create the synthetic audio data segment 200. In some examples, the processor(s) analyzes the respective audio signal waveforms at block 710 to identify a zero crossing point for the start of the cross-fade functions 206, 208. These techniques may help to "smooth" the transition between the combined non-sequential segments 124(2) and 124(4) to mitigate (e.g., conceal, hide, etc.) auditory artifacts that would otherwise result from the modification of the buffered audio data 122 that occurs at block 712.

At block 712, the processor(s) (e.g., the processor(s) 110) may execute the audio data management component 118 to replace the non-sequential segments 124(2) and 124(4) and one or more intermediate segments 124(3) of the audio data 122 between the non-sequential segments 124(2) and 124(4) with the synthetic audio data segment 200 to obtain modified audio data 202 in the buffer 120. Following block 712, the process 700 may proceed to block 706 where the processor(s) may wait for the next statistic calculation period to commence before determining the latency statistic(s) again at block 702. If the audio data management component 118 determines to increase the audio latency at block 708, the process 700 may follow the INCREASE route from block 708 to block 714.

At block 714, the processor(s) (e.g., the processor(s) 110) may execute the audio data management component 118 to create a synthetic audio data segment 300 based at least in part on a combination of non-sequential segments 124 of the audio data 122 stored in the buffer 120. For example, as illustrated in FIG. 3, the audio data management component 118 may create the synthetic audio data segment 300 based at least in part on a combination of non-sequential segments 124(6) and 124(8). In some examples, multiple synthetic audio data segments may be created at block 714 for larger scale modifications to the buffered audio data 122. In some examples, the synthetic audio data segment(s) 300 can be created by overlapping the non-sequential segments 124(6) and 124(8) and cross-fading respective audio signal waveforms of the non-sequential segments 124(6) and 124(8), as described above. For example, the non-sequential segments 124(6) and 124(8) can be overlapped by an amount of overlap 304 that is predetermined or determined dynamically. Furthermore, to cross-fade the respective audio signal waveforms of the non-sequential segments 124(6) and 124(8), a metric (e.g., voltage, power, etc.) associated with the audio signal waveforms may be maintained at a constant value across the overlap 304 by starting a cross-fade function 306 at a value of 1 for one of the audio signal waveforms and ramping to zero, and by starting a cross-fade function 308 at a value of zero for the other of the audio signal waveforms and ramping to 1. In some examples, a windowing function, such as a Hann windowing function, is used to combine the non-sequential audio data segments 124(6) and 124(8) at block 714 to create the synthetic audio data segment 300. In some examples, a PSOLA algorithm can be used to combine the non-sequential audio data segments 124(6) and 124(8) at block 714 to create the synthetic audio data segment 300. In some examples, the processor(s) analyzes the respective audio signal waveforms at block 714 to identify a zero crossing point for the start of the cross-fade functions 306, 308. These techniques may help to "smooth" the transition between the combined non-sequential segments 124(6) and 124(8) to mitigate (e.g., conceal, hide, etc.) auditory artifacts that would otherwise result from the modification of the buffered audio data 122 that occurs at block 716.

At block 716, the processor(s) (e.g., the processor(s) 110) may execute the audio data management component 118 to add the synthetic audio data segment(s) 300 to the buffered audio data 122 (e.g., to the sequence of segments 124(6)-(8) shown in FIG. 3) to obtain modified audio data 302 in the buffer 120. Following block 716, the process 700 may proceed to block 706 where the processor(s) may wait for the next statistic calculation period to commence before determining the latency statistic(s) again at block 702. Accordingly, the process 700 may iterate to continuously, and dynamically, adjust audio latency to maintain the audio latency within a prescribed latency tolerance through iterative modifications to the buffered audio data 122, which adjusts the size 126 of the buffer 120.

Figure 8:
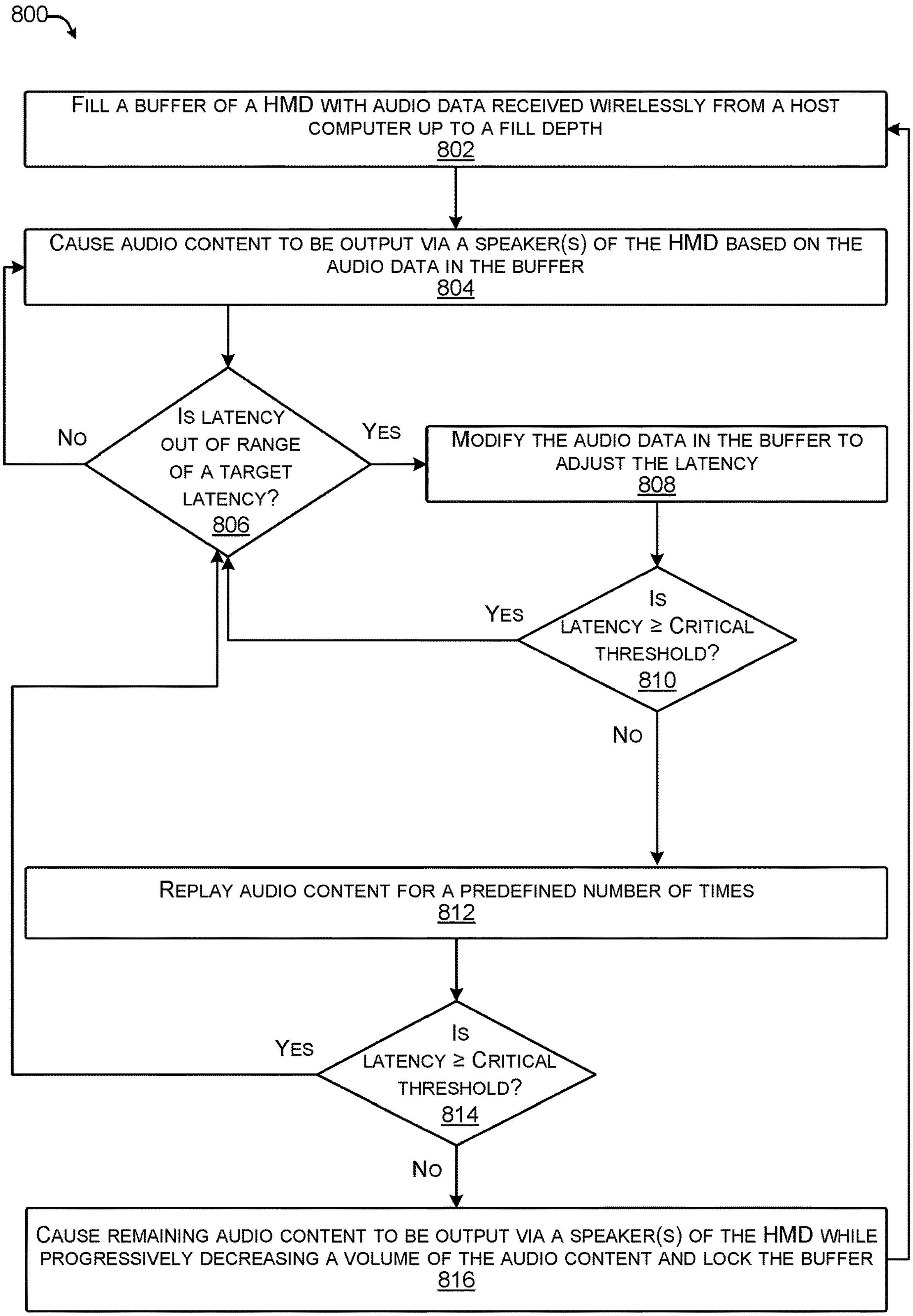
FIG. 8 is a flow diagram of an example process for utilizing thresholds to maintain audio latency within range of a target latency and/or to mitigate auditory artifacts in audio content that is being output via a speaker(s) of a HMD.

FIG. 8 is a flow diagram of an example process 800 for utilizing thresholds to maintain audio latency within range of a target latency and/or to mitigate auditory artifacts in audio content that is being output via a speaker(s) of a HMD. For discussion purposes, the process 800 is described with reference to the previous figures.

At block 802, a processor(s) (e.g., the processor(s) 110 of the HMD 102) may execute the audio data management component 118 to "fill" a buffer 120 of the HMD 102 with audio data 122 received wirelessly from a host computer 106 up to a fill depth. For example, when the user 104 powers on the HMD 102, the buffer 120 may be initially empty. In some examples, the processor(s) (e.g., the processor(s) 110) may execute the audio data management component 118 to "lock" the buffer 120 at block 802 until a threshold amount of the audio data 122 (e.g., a threshold number of audio data segments 124) is stored in the buffer 120 (up to the fill depth). Once the buffer 120 is "filled" to this fill depth, the process 800 may proceed from block 802 to block 804.

At block 804, the processor(s) (e.g., the processor(s) 110) may cause audio content to be output via one or more speakers 116 of the HMD 102 based at least in part on the audio data 122 stored in the buffer 120. For example, the processor(s) may execute the audio data management component 118 to start processing the buffered audio data segments 124 in the buffer 120 to cause corresponding audio content to be output (or played) via the speaker(s) 116 of the HMD 102.

At block 806, a determination is made as to whether a latency associated with the received audio data 122 that is stored in the buffer 120 is out-of-range of a target latency 400 (e.g., less than or equal to a low threshold 402, or greater than or equal to a high threshold 404, as depicted in FIG. 4). In some examples, the determination is made at block 806 based at least in part on one or more latency statistics associated with the buffered audio data 122, as described herein. If the audio data management component 118 determines that the audio latency is not out-of-range of the target latency 400, the process 800 may follow the NO route from block 806 to block 804 where the processor(s) (e.g., the processor(s) 110) may continue to cause audio content to be output via one or more speakers 116 of the HMD 102 based at least in part on the audio data 122 stored in the buffer 120. Notably, as more audio data 122 is received wirelessly by the HMD 102, and as audio content is played via the speaker(s) 116, the buffer 120 is being replenished with audio data 122. If the audio data management component 118 determines that the audio latency is out-of-range of the target latency 400, the process 800 may follow the YES route from block 806 to block 808.

At block 808, the processor(s) (e.g., the processor(s) 110) may execute the audio data management component 118 to modify the audio data 122 stored in the buffer 120 to adjust the audio latency up or down, as the case may be. In some examples, a synthetic audio data segment(s) (e.g., the synthetic audio data segment 200, 300 described above) may be used to modify the buffered audio data 122 at block 808.

At block 810, after modifying the buffered audio data 122 to adjust the audio latency up or down, a determination is made as to whether the audio latency is equal to or greater than a critical threshold 406 that is less than the low threshold 402. In some examples, the determination is made at block 810 based at least in part on one or more latency statistics associated with the buffered audio data 122, as described herein. If the audio data management component 118 determines that the audio latency is equal to or greater than a critical threshold 406 at block 810, the process 800 may follow the YES route from block 810 to block 806 where a determination is made again as to whether the audio latency is out-of-range of a target latency 400 (e.g., less than or equal to a low threshold 402, or greater than or equal to a high threshold 404, as depicted in FIG. 4). If the modification of the audio data 122 stored in the buffer 120 worked as intended to adjust the audio latency to be within range of the target latency 400, the process 800 may iterate blocks 804 and 806. If the audio data management component 118 determines that the audio latency is less than the critical threshold 406 at block 810, the process 800 may follow the NO route from block 810 to block 812.

At block 812, the processor(s) (e.g., the processor(s) 110) may cause audio content to be "replayed" by iteratively outputting audio content via the speaker(s) 116 of the HMD 102 for a predefined number of times (e.g., two times, three times, etc.) in an attempt to allow the audio latency to increase above the critical threshold 406. For example, at least a portion of any remaining audio data 122 in the buffer 120 can be processed to replay the audio content for the predefined number of times. Additionally, or alternatively, a most-recently-played audio data segment(s) 124 may be maintained (e.g., in volatile memory, non-volatile memory, etc.) for a period of time and retrieved at block 812 so that the retrieved audio data segment(s) 124 can be processed iteratively to replay the audio data for the predefined number of times. If audio data 122 is being received by the HMD 102 during the replay at block 812, the buffer 120 may "refill" to a level such that the audio latency meets or exceeds the critical threshold 406. If, on the other hand, network conditions have degraded or a system malfunction has occurred such that no additional audio data 122 is received by the HMD 102 during the replay at block 812, the audio latency may remain below the critical threshold 406.

Accordingly, at block 814, after replaying the audio content for a predefined number of times at block 812, a determination is made again as to whether the audio latency is equal to or greater than the critical threshold 406. In some examples, the determination is made at block 814 based at least in part on one or more latency statistics associated with the buffered audio data 122 (e.g., remaining audio data 122 stored in the buffer 120), as described herein. If the audio data management component 118 determines that the audio latency is equal to or greater than a critical threshold 406 at block 814, the process 800 may follow the YES route from block 814 to block 806 where a determination is made again as to whether the audio latency is out-of-range of a target latency 400 (e.g., less than or equal to a low threshold 402, or greater than or equal to a high threshold 404, as depicted in FIG. 4). In some examples, the process 800 may iterate blocks 806-810 until the audio latency is equal to or greater than the low threshold 402 (i.e., within range of the target latency 400), and, in this scenario, the process 800 may iterate blocks 804 and 806. If the audio data management component 118 determines that the audio latency is less than the critical threshold 406 at block 814, the process 800 may follow the NO route from block 814 to block 816.

At block 816, the processor(s) (e.g., the processor(s) 110) may implement a "last resort" technique of fading out the remaining audio content by progressively decreasing a volume of the audio content as the remaining audio content is output via the speaker(s) 116 of the HMD 102. After this fade out, the process 800 may return to block 802 where the processor(s) may execute the audio data management component 118 to "fill" the buffer 120 with audio data 122 once the audio data 122 is again received wirelessly from the host computer 106 up to a fill depth. Accordingly, the process 800 may be performed so that audio latency can be maintained within range of a target latency 400 under normal operating conditions, and so that auditory artifacts and/or abrupt silence can be mitigated when network conditions degrade past a certain point.

Figure 9:
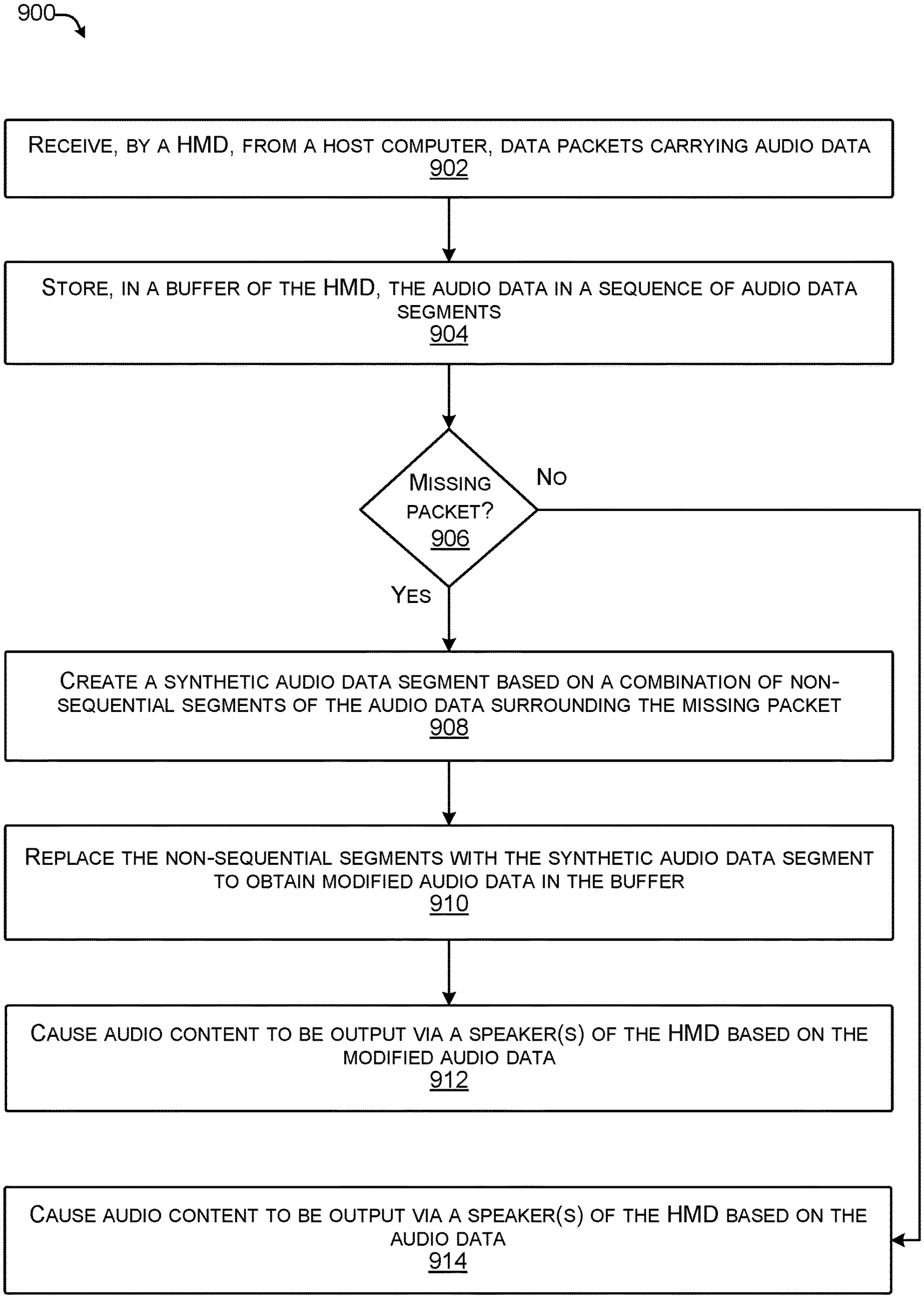
FIG. 9 is a flow diagram of an example process for mitigating auditory artifacts that would otherwise result from an audio data stream that is missing a data packet(s).

FIG. 9 is a flow diagram of an example process 900 for mitigating auditory artifacts that would otherwise result from an audio data stream that is missing a data packet(s). For discussion purposes, the process 900 is described with reference to the previous figures.

At block 902, a HMD 102 may receive, from a host computer 106, data packets carrying audio data 122. The audio data 122 is received wirelessly by the HMD 102 in the data packets at block 902. For example, the HMD 102 may receive the data packets wirelessly at block 902 via the communications interface(s) 112 (e.g., a wireless radio). In some examples, the data packets received at block 902 are numbered sequentially, which may indicate a sequence of the data packets. In some examples, an individual data packet received at block 902 may carry a single frame of audio data 122, or multiple sequential frames of audio data 122. In some examples, an individual data packet may carry a particular amount of audio data 122, as described herein.

At block 904, and in response to receiving the data packets at block 902, a processor(s) (e.g., the processor(s) 110 of the HMD 102) may execute the audio data management component 118 to store the audio data 122 in a buffer 120 of the HMD 102. In some examples, the audio data 122 may be stored in the buffer 120 as a sequence of audio data segments 124(1), 124(2), . . . , 124(N) (collectively 124). An individual audio data segment 124 can represent an audio sample, a frame, a data packet, or any other suitable segment of the received audio data 122. In some examples, the audio data management component 118 may be configured to partition the received audio data 122 into the segments 124, such as by partitioning the audio data 122 into blocks or chunks using any suitable segmentation algorithm, as described herein.

At block 906, the processor(s) (e.g., the processor(s) 110) may execute the audio data management component 118 to analyze the received data packets to determine whether any data packets are missing within the audio data stream. For example, if the data packets received at block 902 are numbered sequentially, if sequentially received data packets skip a number(s) assigned to a data packet(s) in the sequence of data packets, the audio data management component 118 may determine that a data packet(s) is/are missing. In this scenario, the process 900 may follow the YES route from block 906 to block 908.

At block 908, the processor(s) (e.g., the processor(s) 110) may execute the audio data management component 118 to create a synthetic audio data segment 500 based at least in part on a combination of non-sequential segments 124 of the audio data 122 surrounding the missing data packet(s). With reference to the example of FIG. 5 described above, the missing data packet may have been carrying audio data segments labeled #108 and #109 within the sequence of segments labeled #106-111. These missing audio data segments may represent audio data samples within the missing data packet. Accordingly, the sequence of audio data segments 124(9), 124(10), 124(13), and 124(14) in the buffer 120 may include segments 124 labeled #106, #107, #110, #111, as shown in FIG. 5. In this example, the segments 124(10) and 124(13) are non-sequential, and they surround the missing data packet. As such, non-sequential segments 124(10) and 124(13) can be combined to create the synthetic audio data segment 500 at block 908. In some examples, the synthetic audio data segment 500 can be created by overlapping the non-sequential segments 124(10) and 124(13) and cross-fading respective audio signal waveforms of the non-sequential segments 124(10) and 124(13), as described above. For example, the non-sequential segments 124(10) and 124(13) can be overlapped by an amount of overlap 504 that is predetermined or determined dynamically. Furthermore, to cross-fade the respective audio signal waveforms of the non-sequential segments 124(10) and 124(13), a metric (e.g., voltage, power, etc.) associated with the audio signal waveforms may be maintained at a constant value across the overlap 504 by starting a cross-fade function 506 at a value of 1 for one of the audio signal waveforms and ramping to zero, and by starting a cross-fade function 508 at a value of zero for the other of the audio signal waveforms and ramping to 1. In some examples, a windowing function, such as a Hann windowing function, is used to combine the non-sequential audio data segments 124(10) and 124(13) at block 908 to create the synthetic audio data segment 500. In some examples, a PSOLA algorithm can be used to combine the non-sequential audio data segments 124(10) and 124(13) at block 908 to create the synthetic audio data segment 500. In some examples, the processor(s) analyzes the respective audio signal waveforms at block 908 to identify a zero crossing point for the start of the cross-fade functions 506, 508. These techniques may help to "smooth" the transition between the combined non-sequential segments 124(10) and 124(13) to mitigate (e.g., conceal, hide, etc.) auditory artifacts that would otherwise result from the missing data packet(s).

At block 910, the processor(s) (e.g., the processor(s) 110) may execute the audio data management component 118 to replace the non-sequential segments 124(10) and 124(13) with the synthetic audio data segment 500 to obtain modified audio data 502 in the buffer 120. Following block 910, the process 900 may proceed to block 912 where the processor(s) (e.g., the processor(s) 110) may cause audio content to be output via one or more speakers 116 of the HMD 102 based at least in part on the modified audio data 502. For example, a series of audio data segments 124, including the synthetic audio data segment 500, may be processed from the buffer 120 to output corresponding audio content via the speaker(s) 116 at block 912. If the audio data management component 118 determines that no data packets are missing within the audio data stream at block 906, the process 900 may follow the NO route from block 906 to block 914 where the processor(s) (e.g., the processor(s) 110) may cause audio content to be output via one or more speakers 116 of the HMD 102 based at least in part on the unmodified audio data 122 stored in the buffer 120. Accordingly, the process 900 can be performed at runtime, during a session involving the HMD 102 (e.g., during a game session), to mitigate auditory artifacts that would otherwise result from missing (e.g., dropped, lost, etc.) data packets within the audio data stream.

Figure 10:
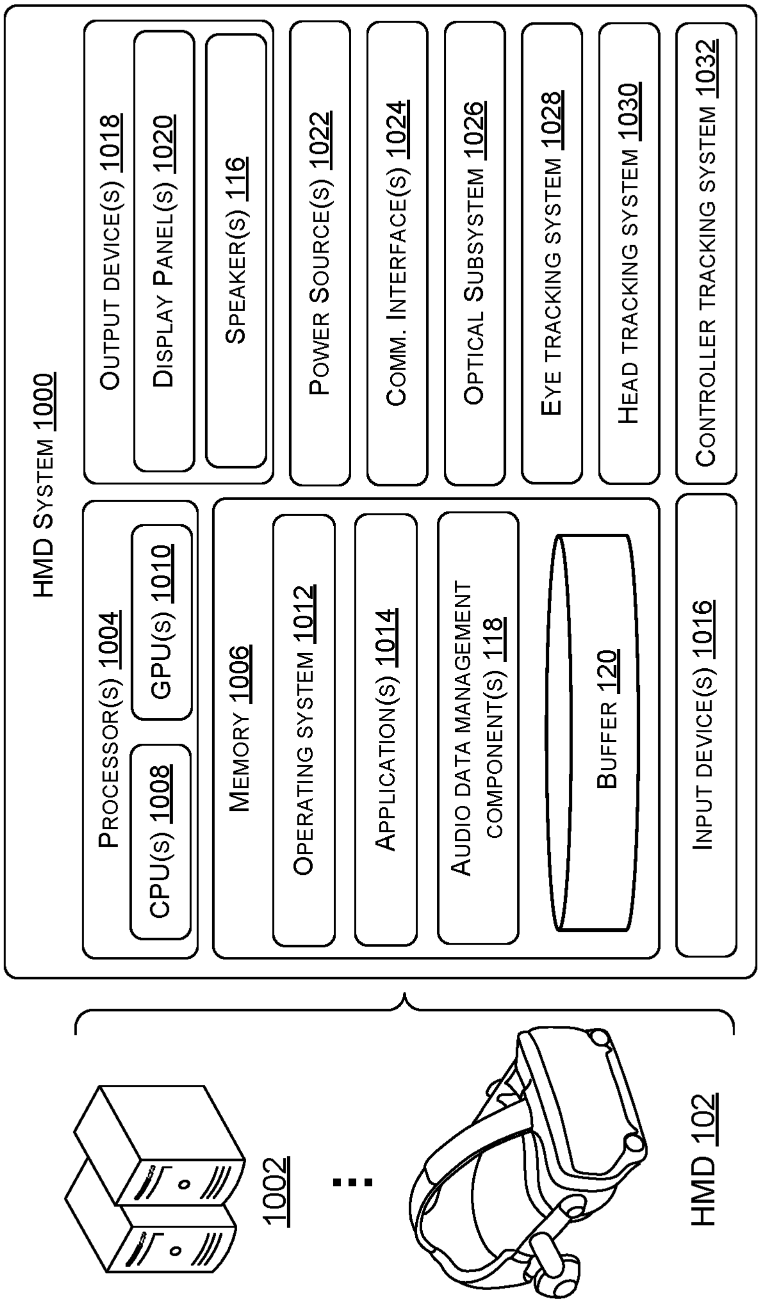
FIG. 10 illustrates example components of a HMD system in which the techniques disclosed herein can be implemented, in accordance with embodiments disclosed herein.

FIG. 10 illustrates example components of a HMD system 1000 in which the techniques disclosed herein can be implemented, in accordance with embodiments disclosed herein. In some examples, the HMD system 1000 can be a distributed system including the HMD 102 and one or more additional computers 1002 that is/are communicatively coupled to the HMD 102. In FIG. 10, the additional computer(s) 1002 may represent, or otherwise include, the host computer 106 of FIG. 1. Additionally, or alternatively, the additional computer(s) 1002 may represent, or otherwise include, a computer(s) that is different from the host computer 106 yet separate from the HMD 102. In some examples, the HMD system 1000 can be a standalone HMD 102, in which case the components illustrated in FIG. 10 may be components of the HMD 102 itself.

The HMD 102 may be implemented as a device that is to be worn by a user 104 (e.g., on a head of the user 104). In some embodiments, the HMD 102 may be head-mountable, such as by allowing a user 104 to secure the HMD 102 on his/her head using a securing mechanism (e.g., an adjustable band) that is sized to fit around a head of a user 104. In some embodiments, the HMD 102 comprises a VR, AR, and/or MR headset that includes a near-eye or near-to-eye display(s). As such, the terms "wearable device", "wearable electronic device", "VR headset", "AR headset", and "head-mounted display (HMD)" may be used interchangeably herein to refer to the HMD 102. However, it is to be appreciated that these types of devices are merely example of a HMD 102, and it is to be appreciated that the HMD 102 may be implemented in a variety of other form factors.

In the illustrated implementation, the HMD system 1000 includes one or more processors 1004 and memory 1006 (e.g., non-transitory computer-readable media). The processor(s) 1004 may be the same as, or similar to, the processor(s) 110 introduced in FIG. 1, and/or the memory 1006 may be the same as, or similar to, the memory 114 introduced in FIG. 1. In some implementations, the processors(s) 1004 may include a CPU(s) 1008, a GPU(s) 1010, both a CPU(s) 1008 and a GPU(s) 1010, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1004 may possess its own local memory, which also may store program modules, program data, and/or one or more operating systems.

The memory 1006 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device. The memory 1006 may be implemented as computer-readable storage media ("CRSM"), which may be any available physical media accessible by the processor(s) 1004 to execute instructions stored on the memory 1006. In one basic implementation, CRSM may include RAM and Flash memory. In other implementations, CRSM may include, but is not limited to, ROM, EEPROM, or any other non-transitory and/or tangible medium which can be used to store the desired information and which can be accessed by the processor(s) 1004.

In general, the HMD system 1000 may include logic (e.g., software, hardware, and/or firmware, etc.) that is configured to implement the techniques, functionality, and/or operations described herein. The memory 1006 is shown as including various modules, such as instruction, datastores, and so forth, which may be configured to execute on the processor(s) 1004 for carrying out the techniques, functionality, and/or operations described herein. A few example functional modules are shown as stored in the memory 1006 and executable on the processor(s) 1004, although the same functionality may alternatively be implemented in hardware, firmware, or as a system on a chip (SOC), and/or other logic.

An operating system module 1012 may be configured to manage hardware within and coupled to the HMD 102 and/or the HMD system 1000 for the benefit of other modules. In addition, in some instances the HMD system 1000 may include one or more applications 1014 stored in the memory 1006 or otherwise accessible to the HMD system 1000. In this implementation, the application(s) 1014 includes a gaming application(s) (e.g., a VR gaming application(s)). However, the HMD system 1000 may include any number or type of applications and is not limited to the specific example shown here. The audio data management component(s) 118 introduced in FIG. 1 may be stored in the memory 1006 and configured to perform the techniques, functionality, and/or operations described herein, such as by implementing one or more steps of the processes 128, 600, 700, 800, and/or 900, which are described in detail above. The memory 1006 may further store the buffer 120 described above, which is usable to implement the techniques, functionality, and/or operations described herein.

Generally, the HMD system 1000 has input devices 1016 and output devices 1018. The input devices 1016 may include control buttons. In some implementations, one or more microphones may function as input devices 1016 to receive audio input, such as user voice input. In some implementations, one or more cameras or other types of sensors, such as an inertial measurement unit (IMU), may function as input devices 1016. For example, an IMU may be configured to detect head motion of the user 104, including for gestural input purposes. Other sensors, such as gyroscopes, accelerometers, magnetometers, color sensors, or other motion, position, and orientation sensors, may be used as input devices 1016 to generate motion, position, and orientation data. These sensors may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. Other sensors may include light sensors that are sensitive to light (e.g., infrared or visible light) that is projected or broadcast by base stations in the environment of the HMD 102. An IMU may be an electronic device that generates calibration data based on measurement signals received from accelerometers, gyroscopes, magnetometers, and/or other sensors suitable for detecting motion, correcting error associated with the IMU, or some combination thereof. Based on the measurement signals such motion-based sensors, such as an IMU, may generate calibration data indicating an estimated position of HMD 102 relative to an initial position of HMD 102. For example, multiple accelerometers may measure translational motion (forward/back, up/down, left/right) and multiple gyroscopes may measure rotational motion (e.g., pitch, yaw, and roll). An IMU can, for example, rapidly sample the measurement signals and calculate the estimated position of HMD 102 from the sampled data. For example, an IMU may integrate measurement signals received from the accelerometers over time to estimate a velocity vector and integrates the velocity vector over time to determine an estimated position of a reference point on HMD 102. The reference point is a point that may be used to describe the position of the HMD 102. While the reference point may generally be defined as a point in space, in various embodiments, reference point is defined as a point within HMD 102 (e.g., a center of the IMU). Alternatively, an IMU may provide the sampled measurement signals to an external console (or other computing device), which determines the calibration data.

Sensors used as input device(s) 1016 may operate at relatively high frequencies in order to provide sensor data at a high rate. For example, sensor data may be generated at a rate of 1000 Hz (or 1 sensor reading every 1 ms). In this way, one thousand readings are taken per second. When sensors generate this much data at this rate (or at a greater rate), the data set used for predicting motion is quite large, even over relatively short time periods on the order of the tens of milliseconds. As mentioned, in some embodiments, the sensors may include light sensors that are sensitive to light emitted by base stations in the environment of the HMD 102 for purposes of tracking position and/or orientation, pose, etc., of the HMD 102 in three-dimensional (3D) space. The calculation of position and/or orientation may be based on timing characteristics of light pulses and the presence or absence of light detected by the sensors.

In some embodiments, additional input devices 1016 may be provided in the form of a keyboard, keypad, mouse, touch screen, joystick, and the like. In other embodiments, the HMD system 1000 may omit a keyboard, keypad, or other similar forms of mechanical input. In some examples, the input device(s) 1016 may include control mechanisms, such as basic volume control button(s) for increasing/decreasing volume, as well as power and reset buttons.

The output devices 1018 may include a display(s) or display panels 1020, (e.g., a stereo pair of display panels). The display panel(s) 1020 may utilize any suitable type of display technology, such as an emissive display that utilizes light emitting elements (e.g., light emitting diodes (LEDs)) to emit light during presentation of frames on the display panel(s) 1020. As an example, display panel(s) 1020 may comprise liquid crystal displays (LCDs), organic light emitting diode (OLED) displays, inorganic light emitting diode (ILED) displays, or any other suitable type of display technology for HMD applications. The output devices 1018 may further include, without limitation, a light element (e.g., LED), a vibrator to create haptic sensations, as well as the aforementioned speaker(s) 119 of the HMD 102. In some examples, the speaker(s) 116 are 37.5 millimeter (mm) off-ear Balanced Mode Radiators (BMR), with a frequency response within a range of about 40 Hz and 24 kHz, an impedance of 6 Ohm, a sound pressure level (SPL) of 98.96 dBSPL at 1 centimeter (cm). In some examples, the off-ear speaker(s) 116 is/are implemented in the form of a sound bar, a speaker(s) embedded in the main HMD body, and/or speakers embedded in the headband of the HMD 102.

The HMD system 1000 may include a power source(s) 1022, such as one or more batteries. Additionally, or alternatively, the HMD 102 may include a power cable port to connect to an external power source via wired means, such as a cable.

The HMD system 1000 may further include a communications interface(s) 1024, which may be the same as, or similar to, the communications interface(s) 112 introduced in FIG. 1. The communications interface(s) 1024 may be, or include, a wireless unit coupled to an antenna(s) to facilitate a wireless connection to a network. Such a wireless unit may implement one or more of various wireless technologies, such as Wi-Fi, Bluetooth, radio frequency (RF), and so on. It is to be appreciated that the HMD 102 may further include physical ports to facilitate a wired connection to a network, a connected peripheral device (including the computer(s) 1002, such as the host computer 106, which may be a PC, a game console, etc.), or a plug-in network device that communicates with other wireless networks.

The HMD 102 may further include optical subsystem 1026 that directs light from the electronic display panel(s) 1020 to a user's eye(s) using one or more optical elements. The optical subsystem 1026 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 1026 may have one or more coatings, such as anti-reflective coatings. Magnification of the image light by optical subsystem 1026 allows electronic display panel(s) 1020 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 1026 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to electronic display panel(s) 1020 for display is pre-distorted, and optical subsystem 1026 corrects the distortion when it receives image light from electronic display panel(s) 1020 generated based on the content.

The HMD system 1000 may further include an eye tracking system 1028. A camera or other optical sensor inside HMD 102 may capture image information of a user's eyes, and eye tracking system 1028 may use the captured information to determine interpupillary distance, interocular distance, a 3D position of each eye relative to HMD 102 (e.g., for distortion adjustment purposes), including a magnitude of torsion and rotation (i.e., roll, pitch, and yaw) and gaze directions for each eye. In one example, infrared light is emitted within HMD 102 and reflected from each eye. The reflected light is received or detected by a camera of the HMD 102 and analyzed to extract eye rotation from changes in the infrared light reflected by each eye. Many methods for tracking the eyes of a user 104 can be used by eye tracking system 1028. Accordingly, eye tracking system 1028 may track up to six degrees of freedom of each eye (i.e., 3D position, roll, pitch, and yaw) and at least a subset of the tracked quantities may be combined from two eyes of a user 104 to estimate a gaze point (i.e., a 3D location or position in the virtual scene where the user is looking). For example, eye tracking system 1028 may integrate information from past measurements, measurements identifying a position of a user's 104 head, and 3D information describing a scene presented by electronic display panel(s) 1020. Thus, information for the position and orientation of the user's 104 eyes is used to determine the gaze point in a virtual scene presented by HMD 102 where the user 104 is looking.

The HMD system 1000 may further include a head tracking system 1030. The head tracking system 1030 may leverage one or more of sensors to track head motion, including head rotation, of the user 104, as described above. For example, the head tracking system 1030 can track up to six degrees of freedom of the HMD 102 (i.e., 3D position, roll, pitch, and yaw). These calculations can be made at every frame of a series of frames so that an application 1014 (e.g., a video game) can determine how to render a scene in the next frame, and the audio data 122 to generate, in accordance with the head position and orientation. In some embodiments, the head tracking system 1030 is configured to predict a future position and/or orientation of the HMD 102 based on current and/or past data. This is because an application 1014 is asked to render a frame before the user 104 actually sees the light (and, hence, the image) on the display(s) 1020. Accordingly, a next frame can be rendered based on this future prediction of head position and/or orientation that was made at an earlier point in time, such as roughly 25-30 ms prior to rendering the frame. In a distributed system where a host computer 106 is communicatively (e.g., wirelessly) coupled to the HMD 102, the future prediction of the head pose may be made 30 ms or more in advance of the illumination time for the frame to account for network latency, compression operations, etc. Rotation data provided by the head tracking system 1030 can be used to determine both direction of HMD 102 rotation, and amount of HMD 102 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 102.

The HMD system 1000 may further include a controller tracking system 1032. The controller tracking system 1032 may leverage one or more of sensors to track controller motion. For example, the controller tracking system 1032 can track up to six degrees of freedom of the controllers the user 104 holds in his/her hands (i.e., 3D position, roll, pitch, and yaw). These calculations can be made at every frame of a series of frames so that an application 1014 (e.g., a video game) can determine how to render virtual controllers and/or virtual hands in a scene in the next frame in accordance with the controller position(s) and orientation(s). In some embodiments, the controller tracking system 1032 is configured to predict a future position and/or orientation of the handheld controllers based on current and/or past data, similar to the description above with respect to the head tracking system 1030.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:

determining, by a processor, one or more statistics indicative of a latency associated with audio data received wirelessly by a head-mounted display (HMD) and stored in a buffer of the HMD;

determining, by the processor, to decrease a size of the buffer based at least in part on the one or more statistics;

creating, by the processor, a synthetic audio data segment based at least in part on a combination of non-sequential segments of the audio data;

replacing, by the processor, the non-sequential segments and one or more intermediate segments of the audio data between the non-sequential segments with the synthetic audio data segment to obtain modified audio data in the buffer; and causing, by the processor, audio content to be output via one or more speakers of the HMD based at least in part on the modified audio data.

2. The method of claim 1, wherein the creating comprises overlapping the non-sequential segments and cross-fading respective audio signal waveforms of the non-sequential segments.

3. The method of claim 1, further comprising:

determining, by the processor, one or more second statistics indicative of a latency associated with second audio data received wirelessly by the HMD and stored in the buffer;

determining, by the processor, to increase the size of the buffer based at least in part on the one or more second statistics;

adding, by the processor, a second synthetic audio data segment to the second audio data to obtain second modified audio data in the buffer; and causing, by the processor, second audio content to be output via the one or more speakers based at least in part on the second modified audio data.

4. The method of claim 3, further comprising creating, by the processor, the second synthetic audio data segment based at least in part on a combination of non-sequential segments of the second audio data.

5. The method of claim 1, further comprising:

determining, by the processor, based at least in part on the one or more statistics, that the latency is greater than or equal to a threshold latency, wherein the threshold latency is greater than a target latency, wherein the determining to decrease the size of the buffer is based at least in part on the latency being greater than or equal to the threshold latency.

6. The method of claim 1, further comprising:

determining, by the processor, one or more second statistics indicative of a latency associated with second audio data received wirelessly by the HMD and stored in the buffer;

determining, by the processor, based at least in part on the one or more second statistics, that the latency associated with the second audio data is less than a threshold latency; and causing, by the processor, second audio content to be replayed via the one or more speakers for a predefined number of times based at least in part on at least a portion of the second audio data.

7. The method of claim 6, further comprising, after causing the second audio content to be replayed for the predefined number of times:

determining, by the processor, one or more third statistics indicative of a latency associated with remaining audio data stored in the buffer;

determining, by the processor, based at least in part on the one or more third statistics, that the latency associated with the remaining audio data is less than the threshold latency; and causing, by the processor, remaining audio content to be output via the one or more speakers based at least in part on the remaining audio data while progressively decreasing a volume of the remaining audio content as the remaining audio content is being output.

8. A head-mounted display (HMD) system comprising:

a HMD comprising one or more speakers;

one or more processors; and memory storing computer-executable instructions that, when executed by the one or more processors, cause the HMD system to:

determine one or more statistics indicative of a latency associated with audio data received wirelessly by the HMD and stored in a buffer of the HMD;

determine to decrease a size of the buffer based at least in part on the one or more statistics;

create a synthetic audio data segment based at least in part on a combination of non-sequential segments of the audio data;

replace the non-sequential segments and one or more intermediate segments of the audio data between the non-sequential segments with the synthetic audio data segment to obtain modified audio data in the buffer; and cause audio content to be output via the one or more speakers based at least in part on the modified audio data.

9. The HMD system of claim 8, wherein creating the synthetic audio data segment comprises overlapping the non-sequential segments and cross-fading respective audio signal waveforms of the non-sequential segments.

10. The HMD system of claim 8, wherein the computer-executable instructions, when executed by the one or more processors, further cause the HMD system to:

determine one or more second statistics indicative of a latency associated with second audio data received wirelessly by the HMD and stored in the buffer;

determine, based at least in part on the one or more second statistics, that the latency associated with the second audio data is less than a threshold latency; and cause second audio content to be replayed via the one or more speakers for a predefined number of times based at least in part on at least a portion of the second audio data.

11. The HMD system of claim 10, wherein the computer-executable instructions, when executed by the one or more processors, further cause the HMD system to, after causing the second audio content to be replayed for the predefined number of times:

determine one or more third statistics indicative of a latency associated with remaining audio data stored in the buffer;

determine, based at least in part on the one or more third statistics, that the latency associated with the remaining audio data is less than the threshold latency; and cause remaining audio content to be output via the one or more speakers based at least in part on the remaining audio data while progressively decreasing a volume of the remaining audio content as the remaining audio content is being output.

12. A method comprising:

determining, by a processor, one or more statistics indicative of a latency associated with audio data received wirelessly by a head-mounted display (HMD) and stored in a buffer of the HMD;

determining, by the processor, to increase a size of the buffer based at least in part on the one or more statistics;

adding, by the processor, a synthetic audio data segment to the audio data without deleting or replacing segments of the audio data to obtain modified audio data in the buffer;

causing, by the processor, audio content to be output via one or more speakers of the HMD based at least in part on the modified audio data;

determining, by the processor, one or more second statistics indicative of a latency associated with second audio data received wirelessly by the HMD and stored in the buffer;

determining, by the processor, to decrease the size of the buffer based at least in part on the one or more second statistics;

replacing, by the processor, segments of the second audio data with a second synthetic audio data segment to obtain second modified audio data in the buffer; and causing, by the processor, second audio content to be output via the one or more speakers based at least in part on the second modified audio data.

13. The method of claim 12, further comprising creating, by the processor, the synthetic audio data segment based at least in part on a combination of non-sequential segments of the audio data.

14. The method of claim 13, wherein the creating comprises overlapping the non-sequential segments and cross-fading respective audio signal waveforms of the non-sequential segments.

15. The method of claim 12, further comprising:

determining, by the processor, based at least in part on the one or more statistics, that the latency associated with the audio data is less than a threshold latency, wherein the threshold latency is less than a target latency, wherein the determining to increase the size of the buffer is based at least in part on the latency associated with the audio data being less than to the threshold latency.

16. The method of claim 12, further comprising:

receiving, by the HMD, data packets carrying third audio data;

storing, by the processor, the third audio data in the buffer;

determining, by the processor, based at least in part on analyzing the data packets, that a missing data packet was not received by the HMD;

replacing, by the processor, non-sequential segments of the third audio data that surround the missing data packet with a third synthetic audio data segment to obtain third modified audio data in the buffer; and causing, by the processor, third audio content to be output via the one or more speakers based at least in part on the third modified audio data.

17. The method of claim 12, further comprising creating, by the processor, the second synthetic audio data segment based at least in part on a combination of non-sequential segments of the second audio data.

18. The method of claim 17, wherein the replacing the segments of the second audio data comprises replacing the non-sequential segments and one or more intermediate segments of the second audio data between the non-sequential segments with the second synthetic audio data segment to obtain the second modified audio data in the buffer.

19. The HMD system of claim 8, wherein the computer-executable instructions, when executed by the one or more processors, further cause the HMD system to:

determine one or more second statistics indicative of a latency associated with second audio data received wirelessly by the HMD and stored in the buffer;

determine to increase the size of the buffer based at least in part on the one or more second statistics;

add a second synthetic audio data segment to the second audio data to obtain second modified audio data in the buffer; and cause second audio content to be output via the one or more speakers based at least in part on the second modified audio data.

20. The method of claim 12, further comprising:

determining, by the processor, based at least in part on the one or more second statistics, that the latency associated with the second audio data is greater than or equal to a threshold latency, wherein the threshold latency is greater than a target latency, wherein the determining to decrease the size of the buffer is based at least in part on the latency associated with the second audio data being greater than or equal to the threshold latency.

* * * * *